United States Patent
Fiedler et al.

(10) Patent No.: US 11,021,652 B2
(45) Date of Patent: *Jun. 1, 2021

(54) PHOSPHOR PARTICLES WITH A PROTECTIVE LAYER, AND METHOD FOR PRODUCING THE PHOSPHOR PARTICLES WITH THE PROTECTIVE LAYER

(71) Applicants: OSRAM Opto Semiconductors GmbH, Regensburg (DE); OSRAM GmbH, Munich (DE)

(72) Inventors: Tim Fiedler, Landsberg am Lech (DE); Sonja Tragl, Augsburg (DE); Stefan Lange, Augsburg (DE)

(73) Assignees: OSRAM OPTO SEMICONDUCTORS GMBH, Regensburg (DE); OSRAM GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,050

(22) Filed: Jun. 24, 2020

(65) Prior Publication Data

US 2020/0332182 A1    Oct. 22, 2020

Related U.S. Application Data

(63) Continuation of application No. 15/556,279, filed as application No. PCT/EP2016/054327 on Mar. 1, 2016, now Pat. No. 10,738,238.

(30) Foreign Application Priority Data

Mar. 6, 2015  (DE) .......................... 102015103326.7

(51) Int. Cl.
   *C09K 11/02*   (2006.01)
   *C09K 11/77*   (2006.01)
   *C09K 11/08*   (2006.01)

(52) U.S. Cl.
   CPC ........ *C09K 11/025* (2013.01); *C09K 11/0883* (2013.01); *C09K 11/7734* (2013.01)

(58) Field of Classification Search
   CPC .............. C09K 11/025; C09K 11/0883; C09K 11/7734
   See application file for complete search history.

(56) References Cited

U.S. PATENT DOCUMENTS

| | | |
|---|---|---|
| 6,602,617 B1 | 8/2003 | Justel et al. |
| 8,287,759 B2 | 10/2012 | Collins et al. |
| 8,519,609 B2 | 8/2013 | Winkler et al. |
| 8,946,982 B2 | 2/2015 | Winkler et al. |
| 9,340,727 B2 | 5/2016 | Takanashi et al. |
| 10,738,238 B2 * | 8/2020 | Fiedler ............... C09K 11/0883 |
| 2006/0263627 A1 | 11/2006 | Grampeix et al. |
| 2011/0279011 A1 | 11/2011 | Murphy et al. |
| 2012/0171360 A1 | 7/2012 | Kijima et al. |
| 2013/0037846 A1 | 2/2013 | Harada et al. |
| 2016/0312118 A1 | 10/2016 | Fiedler et al. |
| 2016/0326430 A1 | 11/2016 | Fiedler et al. |
| 2017/0058195 A1 | 3/2017 | Fiedler et al. |

FOREIGN PATENT DOCUMENTS

| | | |
|---|---|---|
| DE | 19937420 C1 | 12/2000 |
| EP | 2180031 A1 | 4/2010 |
| JP | 2001089759 A | 4/2001 |
| JP | 2009263610 A | 11/2009 |
| JP | 2014532798 A | 12/2014 |
| WO | 2004087831 A1 | 10/2004 |
| WO | 2009059677 A1 | 5/2009 |
| WO | 2009062579 A1 | 5/2009 |
| WO | 2012165290 A1 | 12/2012 |
| WO | 2013070902 A1 | 5/2013 |

* cited by examiner

*Primary Examiner* — C Melissa Koslow
(74) *Attorney, Agent, or Firm* — Slater Matsil, LLP

(57) ABSTRACT

Phospher particles with a Protective Layer and a method for producing phosphor particles with a protective layer are disclosed. In an embodiment the method includes treating Si-containing and/or Al-containing phosphor with an acid solution, wherein a pH value of the acid solution is maintained within a range of pH 3.5 to pH 7 for a period of at least 1 h, wherein an Si-containing layer is formed on the phosphor particles, wherein the Si-containing layer has a higher content of Si on a surface than the phosphor particles, and/or wherein an Al-containing layer is formed on the phosphor particles, wherein the Al-containing layer has a modified content of aluminum on the surface than the phosphor particles and tempering the treated phosphor particles at a temperature of at least 100° C. thereby producing the protective layer.

17 Claims, 20 Drawing Sheets

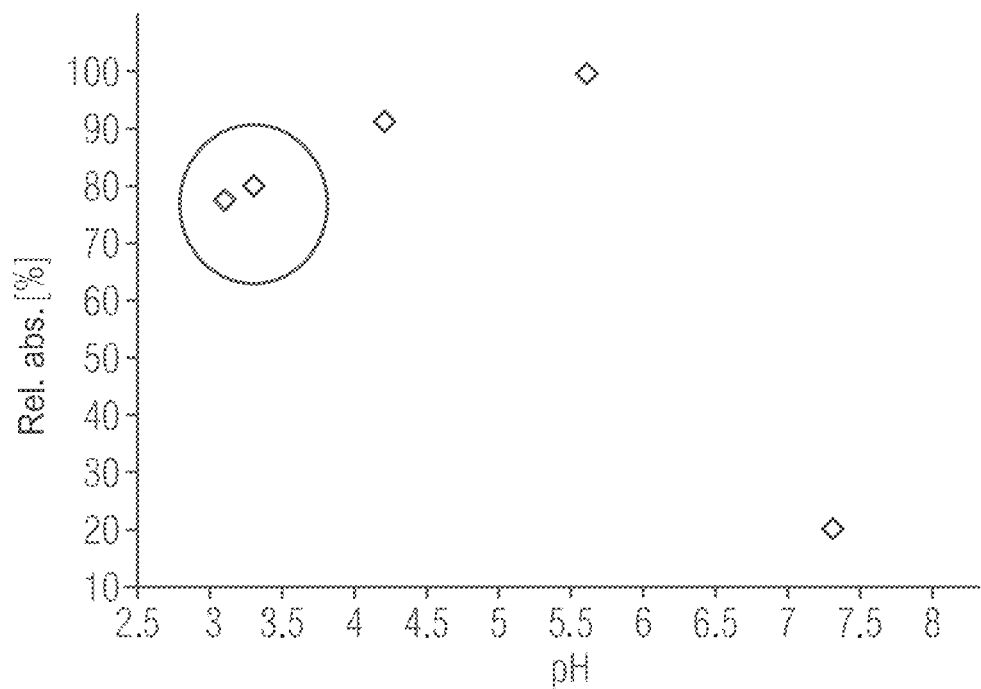
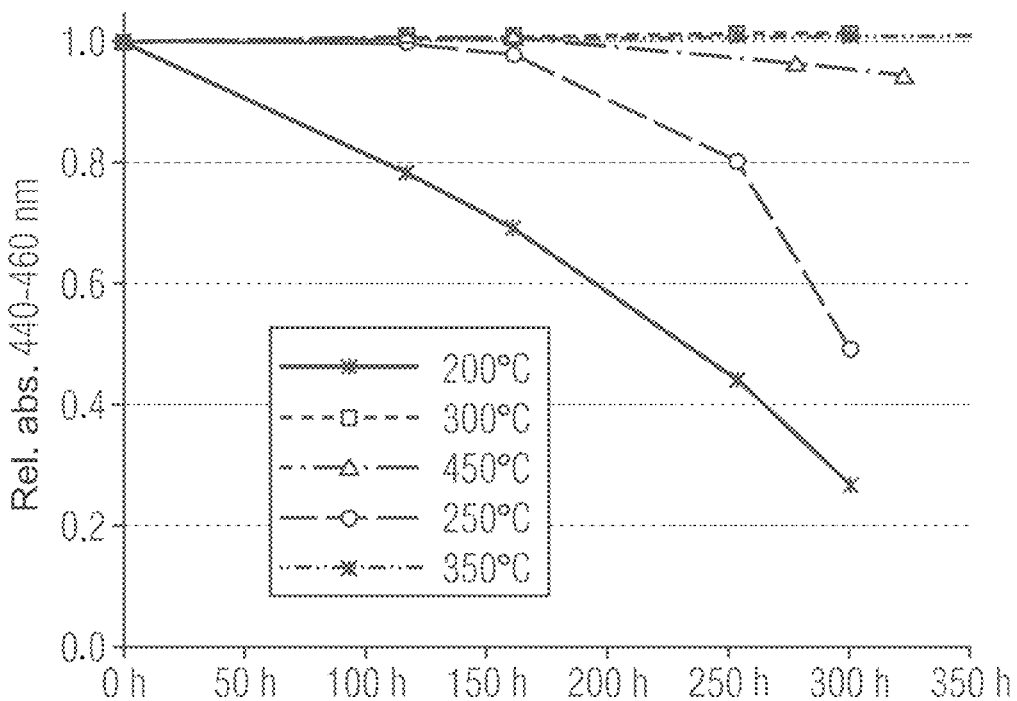

| Sample | Type | C | O | Ca | Sr | Ba | Al | Si | F | N | Σ | ΣAE | ΣAl+Si | ΣAE/ΣAl+Si |
|---|---|---|---|---|---|---|---|---|---|---|---|---|---|---|
| A | Uncoated | 28.6 | 34.0 | 0.2 | 10.9 | 0.8 | 5.8 | 9.8 | 1.1 | 8.8 | 100 | 11.9 | 15.6 | 0.8 |
| B | coated | 41.2 | 35.9 | - | 1.1 | - | 4.1 | 17.0 | 0.2 | 0.5 | 100 | 1.1 | 21.1 | 0.1 |

Fig. 7

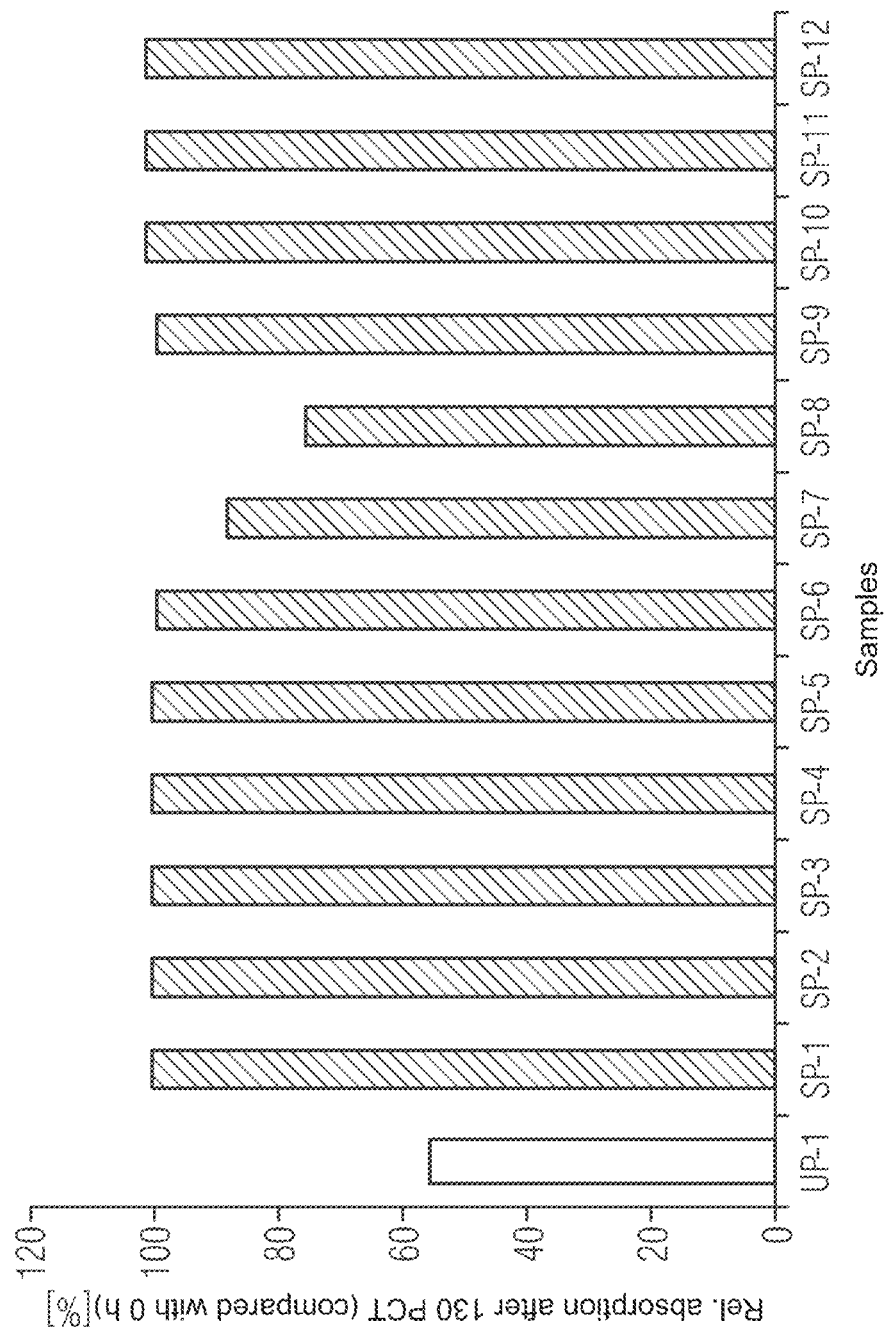

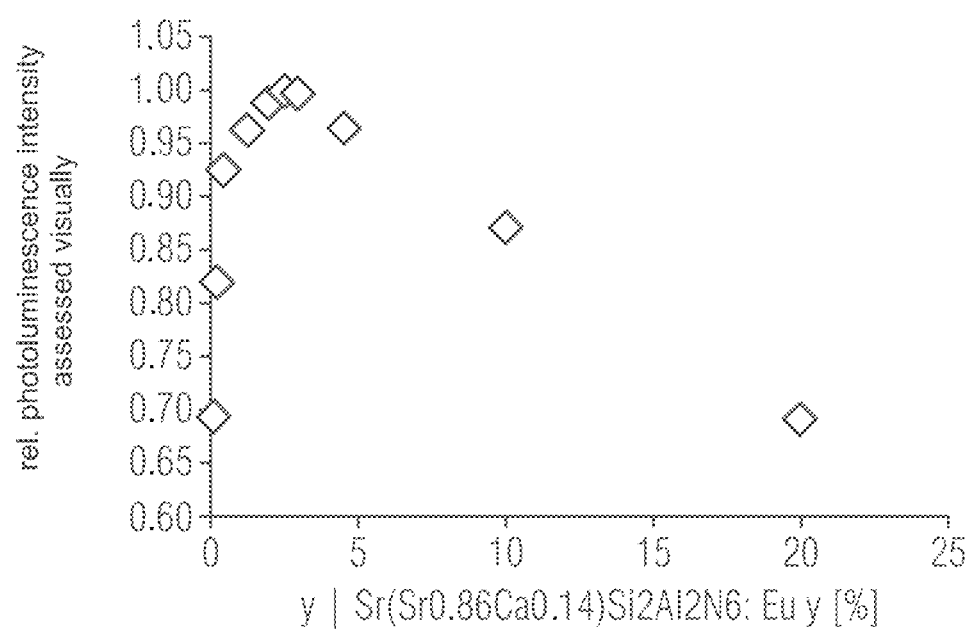

Fig.12a/1

| Experiment | Composition $Ca_xSr_xAlSiN_3:yEu$ bzw. $Sr(Sr_xCa_{1-x})Si_2Al_2N_6:yEu$ (a=2x-1) | | Weight-in sample/g | | | | | | | | | Optical characterisation | |
|---|---|---|---|---|---|---|---|---|---|---|---|---|---|
| | y | x | Ca3N2 | Sr3N2 | AlF3 | SrF2 | BaF2 | Li2B4O7 | LiBF4 | Si3N4 | AlN | Eu2O3 | Total | CIE x | CIE y |
| FH 005_13 | 0.6% | 0.8 | 2.746 | 21.552 | 0.875 | 0.436 | 0 | 0 | 0 | 12.993 | 11.104 | 0.293 | 50 | 0.632 | 0.365 |
| FH 006_13 | 0.6% | 0.8 | 2.730 | 21.428 | 0.290 | 1.301 | 0 | 0 | 0 | 12.918 | 11.040 | 0.292 | 50 | 0.632 | 0.365 |
| FH 007_13 | 0.6% | 0.8 | 2.729 | 21.416 | 0.232 | 1.387 | 0 | 0 | 0 | 12.911 | 11.034 | 0.292 | 50 | 0.634 | 0.364 |
| FH 008_13 | 0.6% | 0.8 | 2.748 | 21.564 | 0.934 | 0.349 | 0 | 0 | 0 | 13.000 | 11.111 | 0.294 | 50 | 0.632 | 0.365 |
| FH 009_13 | 0.6% | 0.8 | 2.738 | 21.492 | 1.163 | 0 | 0 | 0 | 0 | 12.957 | 11.357 | 0.293 | 50 | 0.631 | 0.366 |
| FH 010_13 | 0.6% | 0.8 | 2.646 | 20.769 | 1.124 | 1.682 | 0 | 0 | 0 | 12.521 | 10.975 | 0.283 | 50 | 0.631 | 0.366 |
| FH 011_13 | 0.6% | 0.8 | 2.574 | 20.202 | 1.641 | 2.454 | 0 | 0 | 0 | 12.179 | 10.676 | 0.275 | 50 | 0.633 | 0.364 |
| FH 012_13 | 0.6% | 0.8 | 2.506 | 19.665 | 2.129 | 3.185 | 0 | 0 | 0 | 11.855 | 10.392 | 0.268 | 50 | 0.632 | 0.364 |
| FH 013_13 | 0.6% | 0.8 | 2.731 | 21.434 | 0 | 0 | 0 | 0 | 1.295 | 12.922 | 11.326 | 0.292 | 50 | 0.635 | 0.363 |
| FH 014_13 | 0.6% | 0.8 | 2.735 | 21.463 | 0.581 | 0 | 0 | 0 | 0.648 | 12.939 | 11.342 | 0.292 | 50 | 0.633 | 0.364 |
| FH 015_13 | 0.6% | 0.8 | 2.719 | 21.340 | 0.000 | 0.864 | 0 | 0 | 0.645 | 12.865 | 11.277 | 0.290 | 50 | 0.634 | 0.364 |
| FH 016_13 | 0.6% | 0.8 | 2.725 | 21.389 | 0.387 | 0.578 | 0 | 0 | 0.432 | 12.895 | 11.303 | 0.291 | 50 | 0.633 | 0.364 |
| FH 029_13 | 0.6% | 0.8 | 2.671 | 20.961 | 0 | 0 | 2.369 | 0 | 0 | 12.637 | 11.077 | 0.285 | 50 | 0.633 | 0.364 |
| FH 030_13 | 0.6% | 0.8 | 2.704 | 21.223 | 0.574 | 0 | 1.199 | 0 | 0 | 12.795 | 11.215 | 0.289 | 50 | 0.631 | 0.366 |
| FH 031_13 | 0.6% | 0.8 | 2.689 | 21.103 | 0.000 | 0.854 | 1.193 | 0 | 0 | 12.722 | 11.152 | 0.287 | 50 | 0.630 | 0.367 |
| FH 032_13 | 0.6% | 0.8 | 2.701 | 21.195 | 0.000 | 0 | 1.198 | 0 | 0.640 | 12.778 | 11.200 | 0.289 | 50 | 0.636 | 0.361 |
| FH 037_13 | 0.4% | 0.6 | 5.741 | 16.896 | 0.305 | 1.368 | 0 | 0 | 0 | 13.581 | 11.905 | 0.204 | 50 | 0.636 | 0.360 |
| FH 038_13 | 0.4% | 0.6 | 5.738 | 16.886 | 0.244 | 1.458 | 0 | 0 | 0 | 13.573 | 11.897 | 0.204 | 50 | 0.635 | 0.361 |
| FH 039_13 | 0.4% | 0.6 | 5.776 | 16.999 | 0.920 | 0.459 | 0 | 0 | 0 | 13.664 | 11.977 | 0.206 | 50 | 0.637 | 0.359 |
| FH 040_13 | 0.4% | 0.6 | 5.779 | 17.009 | 0.982 | 0.367 | 0 | 0 | 0 | 13.672 | 11.984 | 0.206 | 50 | 0.638 | 0.358 |
| FH 041_13 | 0.4% | 0.6 | 5.793 | 17.048 | 0.000 | 0 | 0 | 0 | 1.239 | 13.703 | 12.011 | 0.206 | 50 | 0.636 | 0.359 |
| FH 042_13 | 0.4% | 0.6 | 5.793 | 17.049 | 0.615 | 0 | 0 | 0 | 0.620 | 13.704 | 12.012 | 0.206 | 50 | 0.640 | 0.356 |
| FH 043_13 | 0.4% | 0.6 | 5.758 | 16.946 | 0 | 0.915 | 0 | 0 | 0.616 | 13.621 | 11.940 | 0.205 | 50 | 0.639 | 0.357 |
| FH 044_13 | 0.4% | 0.6 | 5.785 | 17.025 | 0 | 0 | 0 | 0.619 | 0.686 | 13.685 | 11.995 | 0.206 | 50 | 0.642 | 0.354 |

Fig. 12a/2

| | | Composition Ca₁₋ₓSrₓAlSiN₃:yEu bzw Sr(Sr₀Ca₁₋ₐ)Si₂Al₂N₆:yEu (a=2x-1) | | | | | | | | | Weight-in sample/g | | | | | | | Optical characterisation | |
|---|---|---|---|---|---|---|---|---|---|---|---|---|---|---|---|---|---|---|---|---|
| Experiment | y | x | Ca3N2 | Sr3N2 | AlF3 | SrF2 | BaF2 | Li2B4O7 | LiBF4 | Si3N4 | AlN | Eu2O3 | Total | | | | | CIE x | CIE y |
| FH 046_13 | 0.4% | 0.6 | 5.747 | 16.913 | 0 | 1.205 | 0 | 0.418 | 0 | 13.595 | 11.917 | 0.205 | 50 | | | | | 0.639 | 0.358 |
| FH 047_13 | 0.4% | 0.6 | 5.737 | 16.885 | 0 | 1.458 | 0 | 0.245 | 0 | 13.573 | 11.997 | 0.204 | 50 | | | | | 0.639 | 0.358 |
| FH 048_13 | 0.4% | 0.6 | 5.782 | 17.017 | 0 | 0 | 0 | 0.421 | 0.905 | 13.679 | 11.990 | 0.206 | 50 | | | | | 0.640 | 0.356 |
| FH 049_13 | 0.4% | 0.6 | 5.780 | 17.011 | 0.809 | 0 | 0 | 0.247 | 1.096 | 13.674 | 11.986 | 0.206 | 50 | | | | | 0.640 | 0.356 |
| FH 050_13 | 0.4% | 0.6 | 5.793 | 17.050 | 0.984 | 0 | 0 | 0.421 | 0 | 13.707 | 12.013 | 0.206 | 50 | | | | | 0.639 | 0.357 |
| FH 051_13 | 0.4% | 0.6 | 5.793 | 17.049 | 0.408 | 0 | 0 | 0.248 | 0 | 13.707 | 12.013 | 0.206 | 50 | | | | | 0.639 | 0.358 |
| FH 052_13 | 0.4% | 0.6 | 5.770 | 16.980 | 0.486 | 0.611 | 0 | 0.411 | 0 | 13.651 | 11.964 | 0.205 | 50 | | | | | 0.639 | 0.358 |
| FH 053_13 | 0.4% | 0.6 | 5.725 | 17.196 | 0.486 | 0.728 | 0 | 0.245 | 0 | 13.545 | 11.871 | 0.204 | 50 | | | | | 0.639 | 0.358 |
| FH 058_13 | 0.4% | 0.6 | 5.704 | 17.134 | 0.906 | 0.606 | 0 | 0.122 | 0 | 13.496 | 11.828 | 0.203 | 50 | | | | | 0.636 | 0.360 |
| FH 059_13 | 0.4% | 0.6 | 5.753 | 17.280 | 0.000 | 1.100 | 0 | 0.123 | 0 | 13.611 | 11.929 | 0.205 | 50 | | | | | 0.637 | 0.360 |
| FH 060_13 | 0.4% | 0.6 | 5.793 | 17.049 | 1.107 | 0.000 | 0 | 0.124 | 0 | 13.707 | 12.013 | 0.206 | 50 | | | | | 0.638 | 0.358 |
| FH 061_13 | 0.4% | 0.6 | 5.722 | 17.166 | 0.818 | 0.548 | 0 | 0.122 | 0 | 13.537 | 11.864 | 0.204 | 50 | | | | | 0.638 | 0.359 |
| FH 064_13 | 0.8% | 0.8 | 2.791 | 21.907 | 0.119 | 0 | 0 | 0 | 0 | 13.209 | 11.577 | 0.398 | 50 | | | | | 0.634 | 0.364 |
| FH 065_13 | 1.0% | 0.8 | 2.786 | 21.853 | 0.118 | 0 | 0 | 0 | 0 | 13.183 | 11.554 | 0.496 | 50 | | | | | 0.638 | 0.360 |
| FH 066_13 | 1.2% | 0.8 | 2.780 | 21.820 | 0.118 | 0 | 0 | 0 | 0 | 13.157 | 11.531 | 0.594 | 50 | | | | | 0.641 | 0.357 |
| FH 067_13 | 1.2% | 0.9 | 1.354 | 23.908 | 0.115 | 0 | 0 | 0 | 0 | 12.814 | 11.230 | 0.579 | 50 | | | | | 0.633 | 0.366 |
| FH 058_13 | 1.2% | 0.875 | 1.704 | 23.397 | 0.116 | 0 | 0 | 0 | 0 | 12.898 | 11.304 | 0.582 | 50 | | | | | 0.636 | 0.362 |
| FH 069_13 | 1.2% | 0.85 | 2.058 | 22.878 | 0.117 | 0 | 0 | 0 | 0 | 12.983 | 11.378 | 0.586 | 50 | | | | | 0.640 | 0.358 |
| FH 070_13 | 1.2% | 0.825 | 2.417 | 22.353 | 0.117 | 0 | 0 | 0 | 0 | 13.069 | 11.454 | 0.590 | 50 | | | | | 0.642 | 0.356 |
| FH 079_13 | 1.2% | 0.925 | 1.009 | 24.413 | 0.114 | 0 | 0 | 0 | 0 | 12.731 | 11.158 | 0.575 | 50 | | | | | 0.628 | 0.370 |
| FH 080_13 | 1.2% | 0.95 | 0.668 | 24.932 | 0.114 | 0 | 0 | 0 | 0 | 12.649 | 11.086 | 0.571 | 50 | | | | | 0.626 | 0.372 |
| FH 081_13 | 1.5% | 0.8 | 2.772 | 21.756 | 0.115 | 0 | 0 | 0 | 0 | 13.118 | 11.497 | 0.740 | 50 | | | | | 0.645 | 0.353 |
| FH 082_13 | 2.0% | 0.8 | 2.759 | 21.649 | 0.117 | 0 | 0 | 0 | 0 | 13.053 | 11.440 | 0.982 | 50 | | | | | 0.654 | 0.345 |
| TF 88/12 | 0.5% | 0.7 | 8.632 | 39.518 | 0.244 | 0 | 0 | 0 | 0 | 27.227 | 23.866 | 0.512 | 100 | | | | | 0.635 | 0.364 |
| TF 93/12 | 0.6% | 0.8 | 5.594 | 43.903 | 0.238 | 0 | 0 | 0 | 0 | 26.468 | 23.200 | 0.598 | 100 | | | | | 0.638 | 0.361 |
| TF 99/12 | 0.5% | 0.7 | 8.632 | 39.518 | 0.244 | 0 | 0 | 0 | 0 | 27.227 | 23.866 | 0.512 | 100 | | | | | 0.632 | 0.366 |

Fig. 12a/3

| Experiment | Composition $Ca_{1-x}Sr_xAlSiN_3:yEu$ bzw. $Sr(Sr_aCa_{1-a})Si_2Al_2N_6:yEu$ (a=2x-1) | | Weight in sample/g | | | | | | | | | Optical characterisation | | |
|---|---|---|---|---|---|---|---|---|---|---|---|---|---|---|
| | y | x | Ca3N2 | Sr3N2 | AlF3 | SrF2 | BaF2 | Li2B4O7 | LiBF4 | Si3N4 | AlN | Eu2O3 | Total | CIE x | CIE y |
| TF 100/12 | 0.6% | 0.8 | 5.594 | 43.903 | 0.238 | 0 | 0 | 0 | 0 | 26.468 | 23.200 | 0.598 | 100 | 0.628 | 0.371 |
| TF 103/12 | 0.5% | 0.8 | 5.600 | 43.947 | 0.238 | 0 | 0 | 0 | 0 | 26.494 | 23.223 | 0.499 | 100 | 0.624 | 0.375 |
| TF 131/12 | 0.6% | 0.9 | 2.724 | 48.097 | 0.231 | 0 | 0 | 0 | 0 | 25.774 | 22.592 | 0.582 | 100 | 0.622 | 0.377 |
| TF 132/12 | 0.7% | 0.9 | 2.721 | 48.050 | 0.231 | 0 | 0 | 0 | 0 | 25.749 | 22.570 | 0.678 | 100 | 0.624 | 0.375 |
| TF 133/12 | 0.8% | 0.9 | 2.719 | 48.004 | 0.231 | 0 | 0 | 0 | 0 | 25.724 | 22.548 | 0.774 | 100 | 0.626 | 0.372 |
| TF 161/12 | 1.0% | 0.9 | 2.713 | 47.911 | 0.231 | 0 | 0 | 0 | 0 | 25.674 | 22.505 | 0.966 | 100 | 0.635 | 0.364 |
| TF 162/12 | 1.2% | 0.9 | 2.708 | 47.818 | 0.230 | 0 | 0 | 0 | 0 | 25.625 | 22.461 | 1.157 | 100 | 0.637 | 0.362 |
| TF 163/12 | 0.6% | 0.85 | 4.140 | 46.028 | 0.235 | 0 | 0 | 0 | 0 | 26.116 | 22.892 | 0.590 | 100 | 0.624 | 0.374 |
| TF 168/12 | 0.9% | 0.9 | 2.716 | 47.957 | 0.231 | 0 | 0 | 0 | 0 | 25.699 | 22.527 | 0.870 | 100 | 0.629 | 0.370 |
| TF 169/12 | 1.2% | 0.95 | 1.337 | 49.826 | 0.227 | 0 | 0 | 0 | 0 | 25.295 | 22.173 | 1.142 | 100 | 0.631 | 0.368 |

Fig. 12b/1

| Experiment | Composition Ca$_{1-x}$Sr$_x$AlSiN$_3$:yEu b/w. Sr(Sr,Ca$_{1-x}$)Si$_2$Al$_2$N$_4$:yEu (a=2x-1) | | EA-share | Si:Al ratio | Weight-in sample/g | | | | | | | | | | | | | | Graphit | | | Optical characterisation | |
|---|---|---|---|---|---|---|---|---|---|---|---|---|---|---|---|---|---|---|---|---|---|---|---|
| | y | x | | | Ca3N2 | Sr3N2 | BaMx | AlF3 | SrF2 | BaF2 | Li2B4O7 | LiBF4 | LiF | Li3N | Mn2O3 | CuO | Zn3N2 | La2O3 | Si3N4 | c | AlN | Eu2O3 | EuN | CeO2 | SiO2 | Total | CIE x | CIE y |
| FH 005_13 | 0.6% | 0.8 | 1 | 1.0:0.975 | 2.746 | 21.552 | 0 | 0.875 | 0.436 | 0 | 0 | 0 | 0 | 0 | 0 | 0 | 0 | 0 | 12.993 | 0 | 11.104 | 0.293 | 0 | 0 | 0 | 50 | 0.632 | 0.365 |
| FH 006_13 | 0.6% | 0.8 | 1 | 1.0:0.975 | 2.730 | 21.428 | 0 | 0.290 | 1.301 | 0 | 0 | 0 | 0 | 0 | 0 | 0 | 0 | 0 | 12.918 | 0 | 11.040 | 0.292 | 0 | 0 | 0 | 50 | 0.632 | 0.365 |
| FH 007_13 | 0.6% | 0.8 | 1 | 1.0:0.975 | 2.729 | 21.416 | 0 | 0.292 | 1.387 | 0 | 0 | 0 | 0 | 0 | 0 | 0 | 0 | 0 | 12.911 | 0 | 11.034 | 0.292 | 0 | 0 | 0 | 50 | 0.634 | 0.364 |
| FH 008_13 | 0.6% | 0.8 | 1 | 1.0:0.975 | 2.748 | 21.564 | 0 | 0.934 | 0.349 | 0 | 0 | 0 | 0 | 0 | 0 | 0 | 0 | 0 | 13.000 | 0 | 11.111 | 0.294 | 0 | 0 | 0 | 50 | 0.632 | 0.365 |
| FH 009_13 | 0.6% | 0.8 | 1 | 1:1 | 2.738 | 21.492 | 0 | 1.163 | 0 | 0 | 0 | 0 | 0 | 0 | 0 | 0 | 0 | 0 | 12.957 | 0 | 11.357 | 0.293 | 0 | 0 | 0 | 50 | 0.631 | 0.366 |
| FH 010_13 | 0.6% | 0.8 | 1 | 1:1 | 2.646 | 20.769 | 0 | 1.124 | 1.582 | 0 | 0 | 0 | 0 | 0 | 0 | 0 | 0 | 0 | 12.521 | 0 | 10.975 | 0.283 | 0 | 0 | 0 | 50 | 0.631 | 0.366 |
| FH 011_13 | 0.6% | 0.8 | 1 | 1:1 | 2.574 | 20.202 | 0 | 1.641 | 2.454 | 0 | 0 | 0 | 0 | 0 | 0 | 0 | 0 | 0 | 12.179 | 0 | 10.676 | 0.275 | 0 | 0 | 0 | 50 | 0.633 | 0.364 |
| FH 012_13 | 0.6% | 0.8 | 1 | 1:1 | 2.506 | 19.665 | 0 | 2.129 | 3.185 | 0 | 0 | 0 | 0 | 0 | 0 | 0 | 0 | 0 | 10.392 | 0 | 10.392 | 0.268 | 0 | 0 | 0 | 50 | 0.632 | 0.364 |
| FH 013_13 | 0.6% | 0.8 | 1 | 1:1 | 2.731 | 21.434 | 0 | 0 | 0 | 0 | 0 | 1.295 | 0 | 0 | 0 | 0 | 0 | 0 | 12.922 | 0 | 11.326 | 0.292 | 0 | 0 | 0 | 50 | 0.635 | 0.363 |
| FH 014_13 | 0.6% | 0.8 | 1 | 1:1 | 2.735 | 21.463 | 0 | 0.581 | 0 | 0 | 0 | 0.648 | 0 | 0 | 0 | 0 | 0 | 0 | 12.939 | 0 | 11.362 | 0.292 | 0 | 0 | 0 | 50 | 0.633 | 0.364 |
| FH 015_13 | 0.6% | 0.8 | 1 | 1:1 | 2.719 | 21.340 | 0 | 0.030 | 0.864 | 0 | 0 | 0.645 | 0 | 0 | 0 | 0 | 0 | 0 | 12.865 | 0 | 11.277 | 0.290 | 0 | 0 | 0 | 50 | 0.634 | 0.364 |
| FH 016_13 | 0.6% | 0.8 | 1 | 1:1 | 2.725 | 21.389 | 0 | 0.387 | 0.578 | 0 | 0 | 0.432 | 0 | 0 | 0 | 0 | 0 | 0 | 12.895 | 0 | 11.303 | 0.291 | 0 | 0 | 0 | 50 | 0.633 | 0.364 |
| FH 029_13 | 0.6% | 0.8 | 1 | 1:1 | 2.671 | 20.961 | 0 | 0 | 0 | 2.369 | 0 | 0 | 0 | 0 | 0 | 0 | 0 | 0 | 12.637 | 0 | 11.077 | 0.285 | 0 | 0 | 0 | 50 | 0.633 | 0.364 |
| FH 030_13 | 0.6% | 0.8 | 1 | 1:1 | 2.704 | 21.223 | 0 | 0.574 | 0 | 1.199 | 0 | 0 | 0 | 0 | 0 | 0 | 0 | 0 | 12.795 | 0 | 11.215 | 0.289 | 0 | 0 | 0 | 50 | 0.631 | 0.366 |
| FH 031_13 | 0.6% | 0.8 | 1 | 1:1 | 2.689 | 21.103 | 0 | 0.000 | 0.354 | 1.193 | 0 | 0 | 0 | 0 | 0 | 0 | 0 | 0 | 12.722 | 0 | 11.152 | 0.287 | 0 | 0 | 0 | 50 | 0.630 | 0.367 |
| FH 032_13 | 0.6% | 0.8 | 1 | 1:1 | 2.701 | 21.195 | 0 | 0.000 | 0 | 1.198 | 0 | 0.540 | 0 | 0 | 0 | 0 | 0 | 0 | 12.778 | 0 | 11.200 | 0.289 | 0 | 0 | 0 | 50 | 0.636 | 0.361 |
| FH 037_13 | 0.4% | 0.6 | 1 | 1:1 | 5.741 | 16.896 | 0 | 0.305 | 1.368 | 0 | 0 | 0 | 0 | 0 | 0 | 0 | 0 | 0 | 13.581 | 0 | 11.905 | 0.204 | 0 | 0 | 0 | 50 | 0.636 | 0.360 |
| FH 038_13 | 0.4% | 0.6 | 1 | 1:1 | 5.738 | 16.886 | 0 | 0.244 | 1.458 | 0 | 0 | 0 | 0 | 0 | 0 | 0 | 0 | 0 | 13.573 | 0 | 11.897 | 0.204 | 0 | 0 | 0 | 50 | 0.635 | 0.361 |
| FH 039_13 | 0.4% | 0.6 | 1 | 1:1 | 5.776 | 16.999 | 0 | 0.920 | 0.459 | 0 | 0 | 0 | 0 | 0 | 0 | 0 | 0 | 0 | 13.664 | 0 | 11.977 | 0.206 | 0 | 0 | 0 | 50 | 0.637 | 0.359 |
| FH 040_13 | 0.4% | 0.6 | 1 | 1:1 | 5.779 | 17.029 | 0 | 0.982 | 0.367 | 0 | 0 | 0 | 0 | 0 | 0 | 0 | 0 | 0 | 13.672 | 0 | 11.984 | 0.206 | 0 | 0 | 0 | 50 | 0.638 | 0.358 |
| FH 041_13 | 0.4% | 0.6 | 1 | 1:1 | 5.793 | 17.048 | 0 | 0.000 | 0 | 0 | 0 | 1.239 | 0 | 0 | 0 | 0 | 0 | 0 | 13.703 | 0 | 12.011 | 0.206 | 0 | 0 | 0 | 50 | 0.636 | 0.359 |
| FH 042_13 | 0.4% | 0.6 | 1 | 1:1 | 5.793 | 17.049 | 0 | 0.615 | 0 | 0 | 0 | 0.620 | 0 | 0 | 0 | 0 | 0 | 0 | 13.704 | 0 | 12.012 | 0.206 | 0 | 0 | 0 | 50 | 0.640 | 0.356 |
| FH 043_13 | 0.4% | 0.6 | 1 | 1:1 | 5.758 | 16.946 | 0 | 0 | 0.935 | 0 | 0 | 0.616 | 0 | 0 | 0 | 0 | 0 | 0 | 13.621 | 0 | 11.940 | 0.205 | 0 | 0 | 0 | 50 | 0.639 | 0.357 |
| FH 044_13 | 0.4% | 0.6 | 1 | 1:1 | 5.785 | 17.025 | 0 | 0 | 0 | 0 | 0.619 | 0.686 | 0 | 0 | 0 | 0 | 0 | 0 | 13.595 | 0 | 11.995 | 0.206 | 0 | 0 | 0 | 50 | 0.642 | 0.354 |
| FH 046_13 | 0.4% | 0.6 | 1 | 1:1 | 5.747 | 16.913 | 0 | 0 | 1.205 | 0 | 0.418 | 0 | 0 | 0 | 0 | 0 | 0 | 0 | 13.585 | 0 | 11.917 | 0.205 | 0 | 0 | 0 | 50 | 0.639 | 0.358 |
| FH 047_13 | 0.4% | 0.6 | 1 | 1:1 | 5.737 | 16.885 | 0 | 0 | 1.458 | 0 | 0.245 | 0 | 0 | 0 | 0 | 0 | 0 | 0 | 13.573 | 0 | 11.897 | 0.204 | 0 | 0 | 0 | 50 | 0.639 | 0.358 |
| FH 048_13 | 0.4% | 0.6 | 1 | 1:1 | 5.782 | 17.017 | 0 | 0 | 0 | 0 | 0.421 | 0.905 | 0 | 0 | 0 | 0 | 0 | 0 | 13.679 | 0 | 11.990 | 0.206 | 0 | 0 | 0 | 50 | 0.640 | 0.356 |
| FH 049_13 | 0.4% | 0.6 | 1 | 1:1 | 5.780 | 17.011 | 0 | 0 | 0 | 0 | 0.297 | 1.096 | 0 | 0 | 0 | 0 | 0 | 0 | 13.674 | 0 | 11.986 | 0.206 | 0 | 0 | 0 | 50 | 0.640 | 0.356 |

Fig. 12b/1 Continued

| Experiment | Composition Ca₂₋ₓSrₓAlSiN₃:yEu b.zw. Sr(SrₐCa₁₋ₐ)Si₂Al₂N₆:yEu (a=2x-1) | | | | | | | | | | Weight-in sample/ g | | | | | | | | | | | | | Graphit | | | | | | | Optical characterisation | |
|---|---|---|---|---|---|---|---|---|---|---|---|---|---|---|---|---|---|---|---|---|---|---|---|---|---|---|---|---|---|---|---|---|
| | y | x | EA-share | Si:Al ratio | Ca3N2 | Sr3N2 | Ba3N2 | AlF3 | SrF2 | BaF2 | Li2B4O7 | LiBP4 | LiF | Li3N | Mn2O3 | CuO | ZnSN2 | La2O3 | Si3N4 | e | AlN | Eu2O3 | EuN | CeO2 | SnO2 | Total | CIE x | CIE y |
| FH 050_13 | 0.4% | 0.6 | 1 | 1:1 | 5.793 | 17.050 | 0 | 0.809 | 0 | 0 | 0.421 | 0 | 0 | 0 | 0 | 0 | 0 | 0 | 13.707 | 0 | 12.013 | 0.206 | 0 | 0 | 0 | 50 | 0.639 | 0.357 |
| FH 051_13 | 0.6% | 0.6 | 1 | 1:1 | 5.793 | 17.049 | 0 | 0.984 | 0 | 0 | 0.248 | 0 | 0 | 0 | 0 | 0 | 0 | 0 | 13.707 | 0 | 12.013 | 0.206 | 0 | 0 | 0 | 50 | 0.639 | 0.358 |
| FH 052_13 | 0.4% | 0.6 | 1 | 1:1 | 5.770 | 16.980 | 0 | 0.408 | 0.611 | 0 | 0.411 | 0 | 0 | 0 | 0 | 0 | 0 | 0 | 13.651 | 0 | 11.964 | 0.205 | 0 | 0 | 0 | 50 | 0.639 | 0.358 |
| FH 053_13 | 0.4% | 0.6 | 1 | 1:1 | 5.725 | 17.196 | 0 | 0.486 | 0.728 | 0 | 0.245 | 0 | 0 | 0 | 0 | 0 | 0 | 0 | 13.545 | 0 | 11.871 | 0.204 | 0 | 0 | 0 | 50 | 0.639 | 0.355 |
| FH 058_13 | 0.4% | 0.6 | 1 | 1:1 | 5.704 | 17.134 | 0 | 0.906 | 0.606 | 0 | 0.122 | 0 | 0 | 0 | 0 | 0 | 0 | 0 | 13.496 | 0 | 11.828 | 0.203 | 0 | 0 | 0 | 50 | 0.636 | 0.360 |
| FH 059_13 | 0.4% | 0.6 | 1 | 1:1 | 5.753 | 17.280 | 0 | 0.006 | 1.100 | 0 | 0.123 | 0 | 0 | 0 | 0 | 0 | 0 | 0 | 13.611 | 0 | 11.929 | 0.205 | 0 | 0 | 0 | 50 | 0.637 | 0.360 |
| FH 060_13 | 0.4% | 0.6 | 1 | 1:1 | 5.793 | 17.049 | 0 | 1.107 | 0 | 0 | 0.124 | 0 | 0 | 0 | 0 | 0 | 0 | 0 | 13.707 | 0 | 12.013 | 0.206 | 0 | 0 | 0 | 50 | 0.638 | 0.358 |
| FH 061_13 | 0.4% | 0.6 | 1 | 1:1 | 5.722 | 17.186 | 0 | 0.818 | 0.548 | 0 | 0.122 | 0 | 0 | 0 | 0 | 0 | 0 | 0 | 13.537 | 0 | 11.864 | 0.204 | 0 | 0 | 0 | 50 | 0.638 | 0.359 |
| FH 064_13 | 0.8% | 0.8 | 1 | 1:1 | 2.791 | 21.507 | 0 | 0.119 | 0 | 0 | 0 | 0 | 0 | 0 | 0 | 0 | 0 | 0 | 13.259 | 0 | 11.577 | 0.398 | 0 | 0 | 0 | 50 | 0.634 | 0.364 |
| FH 065_13 | 1.0% | 0.8 | 1 | 1:1 | 2.786 | 21.863 | 0 | 0.118 | 0 | 0 | 0 | 0 | 0 | 0 | 0 | 0 | 0 | 0 | 13.183 | 0 | 11.554 | 0.496 | 0 | 0 | 0 | 50 | 0.638 | 0.360 |
| FH 066_13 | 1.2% | 0.8 | 1 | 1:1 | 2.780 | 21.929 | 0 | 0.118 | 0 | 0 | 0 | 0 | 0 | 0 | 0 | 0 | 0 | 0 | 13.157 | 0 | 11.531 | 0.594 | 0 | 0 | 0 | 50 | 0.641 | 0.357 |
| FH 067_13 | 1.2% | 0.9 | 1 | 1:1 | 1.354 | 23.908 | 0 | 0.115 | 0 | 0 | 0 | 0 | 0 | 0 | 0 | 0 | 0 | 0 | 12.814 | 0 | 11.236 | 0.579 | 0 | 0 | 0 | 50 | 0.633 | 0.366 |
| FH 068_13 | 1.2% | 0.875 | 1 | 1:1 | 1.704 | 23.397 | 0 | 0.116 | 0 | 0 | 0 | 0 | 0 | 0 | 0 | 0 | 0 | 0 | 12.898 | 0 | 11.304 | 0.582 | 0 | 0 | 0 | 50 | 0.636 | 0.362 |
| FH 069_13 | 1.2% | 0.85 | 1 | 1:1 | 2.058 | 22.878 | 0 | 0.117 | 0 | 0 | 0 | 0 | 0 | 0 | 0 | 0 | 0 | 0 | 12.983 | 0 | 11.378 | 0.586 | 0 | 0 | 0 | 50 | 0.640 | 0.358 |
| FH 070_13 | 1.2% | 0.825 | 1 | 1:1 | 2.417 | 22.353 | 0 | 0.117 | 0 | 0 | 0 | 0 | 0 | 0 | 0 | 0 | 0 | 0 | 13.069 | 0 | 11.454 | 0.590 | 0 | 0 | 0 | 50 | 0.642 | 0.356 |
| FH 079_13 | 1.2% | 0.925 | 1 | 1:1 | 1.009 | 24.413 | 0 | 0.114 | 0 | 0 | 0 | 0 | 0 | 0 | 0 | 0 | 0 | 0 | 12.731 | 0 | 11.158 | 0.575 | 0 | 0 | 0 | 50 | 0.628 | 0.370 |
| FH 080_13 | 1.2% | 0.95 | 1 | 1:1 | 0.668 | 24.912 | 0 | 0.114 | 0 | 0 | 0 | 0 | 0 | 0 | 0 | 0 | 0 | 0 | 12.649 | 0 | 11.086 | 0.571 | 0 | 0 | 0 | 50 | 0.626 | 0.372 |
| FH 081_13 | 1.5% | 0.8 | 1 | 1:1 | 2.772 | 21.756 | 0 | 0.118 | 0 | 0 | 0 | 0 | 0 | 0 | 0 | 0 | 0 | 0 | 13.118 | 0 | 11.497 | 0.740 | 0 | 0 | 0 | 50 | 0.645 | 0.353 |
| FH 082_13 | 2.0% | 0.8 | 1 | 1:1 | 2.759 | 21.649 | 0 | 0.117 | 0 | 0 | 0 | 0 | 0 | 0 | 0 | 0 | 0 | 0 | 13.053 | 0 | 11.440 | 0.982 | 0 | 0 | 0 | 50 | 0.654 | 0.345 |
| TF 88/12 | 0.5% | 0.7 | 1 | 1:1 | 8.632 | 39.518 | 0 | 0.244 | 0 | 0 | 0 | 0 | 0 | 0 | 0 | 0 | 0 | 0 | 27.227 | 0 | 23.866 | 0.512 | 0 | 0 | 0 | 100 | 0.635 | 0.364 |
| TF 93/12 | 0.6% | 0.8 | 1 | 1:1 | 5.594 | 43.903 | 0 | 0.238 | 0 | 0 | 0 | 0 | 0 | 0 | 0 | 0 | 0 | 0 | 26.458 | 0 | 23.290 | 0.598 | 0 | 0 | 0 | 100 | 0.638 | 0.361 |
| TF 99/12 | 0.5% | 0.7 | 1 | 1:1 | 8.632 | 39.518 | 0 | 0.244 | 0 | 0 | 0 | 0 | 0 | 0 | 0 | 0 | 0 | 0 | 27.227 | 0 | 23.866 | 0.512 | 0 | 0 | 0 | 100 | 0.632 | 0.366 |
| TF 100/12 | 0.6% | 0.8 | 1 | 1:1 | 5.594 | 43.903 | 0 | 0.238 | 0 | 0 | 0 | 0 | 0 | 0 | 0 | 0 | 0 | 0 | 26.454 | 0 | 23.200 | 0.598 | 0 | 0 | 0 | 100 | 0.628 | 0.371 |
| TF 103/12 | 0.5% | 0.8 | 1 | 1:1 | 5.600 | 43.947 | 0 | 0.238 | 0 | 0 | 0 | 0 | 0 | 0 | 0 | 0 | 0 | 0 | 26.494 | 0 | 23.223 | 0.499 | 0 | 0 | 0 | 100 | 0.624 | 0.375 |
| TF 131/12 | 0.6% | 0.9 | 1 | 1:1 | 2.724 | 48.097 | 0 | 0.231 | 0 | 0 | 0 | 0 | 0 | 0 | 0 | 0 | 0 | 0 | 25.774 | 0 | 22.592 | 0.582 | 0 | 0 | 0 | 100 | 0.622 | 0.377 |
| TF 132/12 | 0.7% | 0.9 | 1 | 1:1 | 2.721 | 48.050 | 0 | 0.231 | 0 | 0 | 0 | 0 | 0 | 0 | 0 | 0 | 0 | 0 | 25.749 | 0 | 22.570 | 0.678 | 0 | 0 | 0 | 100 | 0.624 | 0.375 |
| TF 133/12 | 0.8% | 0.9 | 1 | 1:1 | 2.719 | 48.004 | 0 | 0.231 | 0 | 0 | 0 | 0 | 0 | 0 | 0 | 0 | 0 | 0 | 25.724 | 0 | 22.548 | 0.774 | 0 | 0 | 0 | 100 | 0.626 | 0.372 |
| TF 161/12 | 1.0% | 0.9 | 1 | 1:1 | 2.713 | 47.911 | 0 | 0.231 | 0 | 0 | 0 | 0 | 0 | 0 | 0 | 0 | 0 | 0 | 25.674 | 0 | 22.505 | 0.966 | 0 | 0 | 0 | 100 | 0.635 | 0.364 |
| TF 162/12 | 1.2% | 0.9 | 1 | 1:1 | 2.708 | 47.818 | 0 | 0.230 | 0 | 0 | 0 | 0 | 0 | 0 | 0 | 0 | 0 | 0 | 25.635 | 0 | 22.461 | 1.157 | 0 | 0 | 0 | 100 | 0.637 | 0.367 |
| TF 163/12 | 0.6% | 0.85 | 1 | 1:1 | 4.140 | 46.028 | 0 | 0.235 | 0 | 0 | 0 | 0 | 0 | 0 | 0 | 0 | 0 | 0 | 26.116 | 0 | 22.892 | 0.590 | 0 | 0 | 0 | 100 | 0.624 | 0.374 |
| TF 168/12 | 0.9% | 0.9 | 1 | 1:1 | 2.716 | 47.957 | 0 | 0.231 | 0 | 0 | 0 | 0 | 0 | 0 | 0 | 0 | 0 | 0 | 25.699 | 0 | 22.527 | 0.870 | 0 | 0 | 0 | 100 | 0.629 | 0.370 |
| TF 169/12 | 1.2% | 0.95 | 1 | 1:1 | 1.337 | 49.826 | 0 | 0.227 | 0 | 0 | 0 | 0 | 0 | 0 | 0 | 0 | 0 | 0 | 25.295 | 0 | 22.173 | 1.142 | 0 | 0 | 0 | 100 | 0.631 | 0.368 |

Fig. 12b/2

| Experiment | Composition Ca$_x$Sr$_a$AlSiN$_3$:yEu b:xx Sr(Sr-Ca$_{1-b}$)SiAl$_b$N$_c$yEu (a=2y-1) | | | EA-share | Si:Al ratio | Weight-in sample / g | | | | | | | | | | | | | | | | | Graphit e | | | | | | Optical characterisation | |
|---|---|---|---|---|---|---|---|---|---|---|---|---|---|---|---|---|---|---|---|---|---|---|---|---|---|---|---|---|---|---|
| | y | x | | | | Ca3N2 | Sr3N2 | BaNx | AlF3 | SrF2 | BaF2 | Li2B4O7 | LiBF4 | LiF | Li3N | Mn2O3 | CuO | Zn3N2 | La2O3 | SiNx4 | | AlN | Eu2O3 | EuN | CeO2 | SiO2 | Total | CIE x | CIE y |
| FH 086_13 | 1.2% | 0.9 | 1 | 1:1 | 4.062 | 71.725 | 0 | 0.345 | 0 | 0 | 0 | 0 | 0 | 0 | 0 | 0 | 0 | 0 | 38.442 | 0 | 33.691 | 1.736 | 0 | 0 | 0 | 150 | 0.634 | 0.364 |
| FH 095_13 | 1.2% | 0.9 | 1 | 1:1 | 1.311 | 23.146 | 0 | 0.111 | 0 | 0 | 0 | 0 | 0 | 0 | 0 | 0 | 0 | 0 | 12.406 | 0 | 10.872 | 0.560 | 0 | 0 | 0 | 50 | 0.635 | 0.363 |
| FH 096_13 | 1.2% | 0.9 | 1 | 1:1 | 1.354 | 23.908 | 0 | 0.115 | 0 | 0 | 0 | 0 | 0 | 0 | 0 | 0 | 0 | 0 | 12.814 | 0 | 11.230 | 0.579 | 0 | 0 | 1.593 | 50 | 0.637 | 0.361 |
| FH 097_13 | 1.2% | 0.9 | 1 | 1:1 | 1.354 | 23.908 | 0 | 0.115 | 0 | 0 | 0 | 0 | 0 | 0 | 0 | 0 | 0 | 0 | 12.814 | 0 | 11.230 | 0.579 | 0 | 0 | 0 | 50 | 0.635 | 0.363 |
| FH 098_13 | 1.2% | 0.9 | 1 | 1:1 | 1.354 | 23.908 | 0 | 0.115 | 0 | 0 | 0 | 0.628 | 0 | 0 | 0 | 0 | 0 | 0 | 12.814 | 0 | 11.230 | 0.579 | 0 | 0 | 0 | 50 | 0.639 | 0.359 |
| FH 099_13 | 1.2% | 0.9 | 1 | 1:1 | 1.325 | 23.391 | 0 | 0 | 0 | 0 | 0.567 | 0 | 0 | 0 | 0 | 0 | 0 | 0 | 12.537 | 0 | 10.987 | 0.566 | 0 | 0 | 0 | 50 | 0.638 | 0.359 |
| FH 100_13 | 1.2% | 0.9 | 1 | 1:1 | 1.354 | 23.905 | 0 | 0 | 0 | 0 | 0.058 | 0.064 | 0 | 0 | 0 | 0 | 0 | 0 | 12.812 | 0 | 11.229 | 0.578 | 0 | 0 | 0 | 50 | 0.637 | 0.362 |
| FH 101_13 | 1.2% | 0.9 | 1 | 1:1 | 1.354 | 23.902 | 0 | 0 | 0 | 0 | 0 | 0.128 | 0 | 0 | 0 | 0 | 0 | 0 | 12.810 | 0 | 11.227 | 0.578 | 0 | 0 | 0 | 50 | 0.636 | 0.362 |
| FH 102_13 | 1.2% | 0.9 | 1 | 1:1 | 1.354 | 23.908 | 0 | 0 | 0 | 0 | 0.116 | 0 | 0 | 0 | 0 | 0 | 0 | 0 | 12.814 | 0 | 11.230 | 0.579 | 0 | 0 | 0 | 50 | 0.634 | 0.364 |
| FH 105_13 | 1.2% | 0.9 | 1 | 1:1 | 4.161 | 71.706 | 0 | 0 | 0 | 0 | 0 | 0.385 | 0 | 0 | 0 | 0 | 0 | 0 | 38.431 | 0 | 33.682 | 1.735 | 0 | 0 | 0 | 150 | 0.636 | 0.363 |
| TH 800_13 | 1.2% | 0.99 | 1.1 | 1:1 | 1.417 | 25.028 | 0 | 0 | 0 | 0 | 0 | 0.122 | 0 | 0 | 0 | 0 | 0 | 0 | 13.194 | 0 | 10.887 | 0.551 | 0 | 0 | 0 | 50 | 0.634 | 0.365 |
| TH 801_13 | 1.2% | 0.9 | 1 | 1:1 | 1.354 | 23.902 | 0 | 0 | 0 | 0 | 0 | 0.128 | 0 | 0 | 0 | 0 | 0 | 0 | 12.810 | 0 | 11.227 | 0.578 | 0 | 0 | 0 | 50 | 0.637 | 0.362 |
| TH 802_13 | 1.2% | 0.9 | 1 | 1.1:0.9 | 1.349 | 23.826 | 0 | 0 | 0 | 0 | 0 | 0.128 | 0 | 0 | 0 | 0 | 0 | 0 | 14.047 | 0 | 10.073 | 0.577 | 0 | 0 | 0 | 50 | 0.639 | 0.360 |
| TH 803_13 | 1.2% | 0.81 | 0.9 | 0.9:1.1 | 1.287 | 22.732 | 0 | 0 | 0 | 0 | 0 | 0.136 | 0 | 0 | 0 | 0 | 0 | 0 | 12.183 | 0 | 13.051 | 0.611 | 0 | 0 | 0 | 50 | 0.636 | 0.362 |
| TH 804_13 | 1.2% | 0.945 | 1.05 | 0.9:1.1 | 1.391 | 24.555 | 0 | 0 | 0 | 0 | 0 | 0.126 | 0 | 0 | 0 | 0 | 0 | 0 | 11.260 | 0 | 12.083 | 0.566 | 0 | 0 | 0 | 50 | 0.633 | 0.365 |
| TH 805_13 | 1.2% | 0.855 | 0.95 | 0.95:1.05 | 1.321 | 23.333 | 0 | 0 | 0 | 0 | 0 | 0.132 | 0 | 0 | 0 | 0 | 0 | 0 | 12.506 | 0 | 12.114 | 0.594 | 0 | 0 | 0 | 50 | 0.637 | 0.361 |
| TH 806_13 | 1.2% | 0.945 | 1.05 | 1.05:0.95 | 1.384 | 24.411 | 0 | 0 | 0 | 0 | 0 | 0.125 | 0 | 0 | 0 | 0 | 0 | 0 | 13.099 | 0 | 10.387 | 0.563 | 0 | 0 | 0 | 50 | 0.640 | 0.359 |
| TH 807_13 | 1.2% | 0.81 | 0.9 | 1.1:0.9 | 1.279 | 22.581 | 0 | 0 | 0 | 0 | 0 | 0.135 | 0 | 0 | 0 | 0 | 0 | 0 | 14.792 | 0 | 10.601 | 0.607 | 0 | 0 | 0 | 50 | 0.640 | 0.358 |
| TF 808_13 | 1.2% | 0.855 | 0.95 | 1:1 | 1.319 | 23.295 | 0 | 0 | 0 | 0 | 0 | 0.132 | 0 | 0 | 0 | 0 | 0 | 0 | 13.142 | 0 | 11.518 | 0.593 | 0 | 0 | 0 | 50 | 0.637 | 0.362 |
| TF 809_13 | 1.2% | 0.99 | 1.1 | 0.9:1.1 | 1.422 | 25.104 | 0 | 0 | 0 | 0 | 0 | 0.123 | 0 | 0 | 0 | 0 | 0 | 0 | 11.008 | 0 | 11.792 | 0.552 | 0 | 0 | 0 | 50 | 0.637 | 0.361 |
| TF 810_13 | 1.2% | 0.99 | 1.1 | 1.1:0.9 | 1.413 | 24.953 | 0 | 0 | 0 | 0 | 0 | 0.122 | 0 | 0 | 0 | 0 | 0 | 0 | 13.374 | 0 | 9.590 | 0.549 | 0 | 0 | 0 | 50 | 0.637 | 0.362 |
| TF 811_13 | 1.2% | 0.855 | 0.95 | 1.05:0.95 | 1.317 | 23.257 | 0 | 0 | 0 | 0 | 0 | 0.132 | 0 | 0 | 0 | 0 | 0 | 0 | 13.777 | 0 | 10.925 | 0.592 | 0 | 0 | 0 | 50 | 0.637 | 0.361 |
| TF 812_13 | 1.2% | 0.99 | 1.1 | 0.95:1.05 | 1.420 | 25.066 | 0 | 0 | 0 | 0 | 0 | 0.122 | 0 | 0 | 0 | 0 | 0 | 0 | 11.602 | 0 | 11.239 | 0.551 | 0 | 0 | 0 | 50 | 0.635 | 0.364 |
| TF 813_13 | 1.2% | 0.99 | 1.1 | 1.05:0.95 | 1.415 | 24.990 | 0 | 0 | 0 | 0 | 0 | 0.122 | 0 | 0 | 0 | 0 | 0 | 0 | 12.795 | 0 | 10.338 | 0.550 | 0 | 0 | 0 | 50 | 0.636 | 0.363 |
| TF 814_13 | 1.2% | 0.9 | 1.0 | 0.9:1.1 | 1.358 | 23.978 | 0 | 0 | 0 | 0 | 0 | 0.129 | 0 | 0 | 0 | 0 | 0 | 0 | 11.566 | 0 | 12.389 | 0.580 | 0 | 0 | 0 | 50 | 0.637 | 0.361 |
| TF 815_13 | 1.2% | 0.945 | 1.1 | 0.95:1.05 | 1.388 | 24.517 | 0 | 0 | 0 | 0 | 0 | 0.125 | 0 | 0 | 0 | 0 | 0 | 0 | 11.888 | 0 | 11.516 | 0.565 | 0 | 0 | 0 | 50 | 0.634 | 0.364 |

Fig. 12b/2 Continued

| Experiment | Composition Ca:Sr:AlSiN:yEu bcw Sr(Sr,Ca,s)Si,Al,N,yEu (a=2x-1) y | x | EA-share | Si:Al ratio | Ca3N2 | Sr3N2 | Ba3N2 | AlF3 | SrF2 | BaF2 | Li2B4O7 | UBF4 | LiF | Li3N | Mn2O3 | CuO | Zn3N2 | La2O3 | Si3N4 | Graphite | AlN | Eu2O3 | EuN | CeO2 | SiO2 | Total | Optical characterization CIE x | CIE y |
|---|---|---|---|---|---|---|---|---|---|---|---|---|---|---|---|---|---|---|---|---|---|---|---|---|---|---|---|---|
| Tri816_13 | 1.2% | 0.81 | 0.9 | 0.95:1.05 | 1.285 | 22.694 | 0 | 0 | 0 | 0 | 0 | 0.135 | 0 | 0 | 0 | 0 | 0 | 0 | 12.839 | 0 | 12.437 | 0.616 | 0 | 0 | 0 | 50 | 0.636 | 0.362 |
| Tri817_13 | 1.2% | 0.945 | 1.1 | 1:1 | 1.386 | 24.479 | 0 | 0 | 0 | 0 | 0 | 0.125 | 0 | 0 | 0 | 0 | 0 | 0 | 22.495 | 0 | 10.951 | 0.564 | 0 | 0 | 0 | 50 | 0.634 | 0.364 |
| Tri818_13 | 1.2% | 0.81 | 0.9 | 1.05:0.95 | 1.281 | 22.618 | 0 | 0 | 0 | 0 | 0 | 0.135 | 0 | 0 | 0 | 0 | 0 | 0 | 14.143 | 0 | 11.235 | 0.608 | 0 | 0 | 0 | 50 | 0.640 | 0.358 |
| Tri819_13 | 1.2% | 0.855 | 1.0 | 0.9:1.1 | 1.324 | 23.371 | 0 | 0 | 0 | 0 | 0 | 0.132 | 0 | 0 | 0 | 0 | 0 | 0 | 11.867 | 0 | 12.711 | 0.595 | 0 | 0 | 0 | 50 | 0.635 | 0.364 |
| Tri820_13 | 1.2% | 0.945 | 1.1 | 1.1:0.9 | 1.382 | 24.403 | 0 | 0 | 0 | 0 | 0 | 0.125 | 0 | 0 | 0 | 0 | 0 | 0 | 13.702 | 0 | 9.825 | 0.562 | 0 | 0 | 0 | 50 | 0.642 | 0.356 |
| Tri821_13 | 1.2% | 0.81 | 0.9 | 1:1 | 1.293 | 22.656 | 0 | 0 | 0 | 0 | 0 | 0.135 | 0 | 0 | 0 | 0 | 0 | 0 | 13.492 | 0 | 11.825 | 0.609 | 0 | 0 | 0 | 50 | 0.638 | 0.360 |
| Tri822_13 | 1.2% | 0.9 | 1.0 | 0.95:1.05 | 1.356 | 23.940 | 0 | 0 | 0 | 0 | 0 | 0.129 | 0 | 0 | 0 | 0 | 0 | 0 | 12.189 | 0 | 11.807 | 0.579 | 0 | 0 | 0 | 50 | 0.634 | 0.364 |
| Tri823_13 | 1.2% | 0.855 | 1.0 | 1.1:0.9 | 1.335 | 23.220 | 0 | 0 | 0 | 0 | 0 | 0.131 | 0 | 0 | 0 | 0 | 0 | 0 | 14.416 | 0 | 10.353 | 0.591 | 0 | 0 | 0 | 50 | 0.638 | 0.360 |
| Tri824_13 | 1.2% | 0.9 | 1.0 | 1.05:0.95 | 1.351 | 22.864 | 0 | 0 | 0 | 0 | 0 | 0.128 | 0 | 0 | 0 | 0 | 0 | 0 | 13.430 | 0 | 10.649 | 0.577 | 0 | 0 | 0 | 50 | 0.637 | 0.362 |
| Tri825_13 | 1.2% | 0.855 | 1.0 | 0.95:1.05 | 1.321 | 23.333 | 0 | 0 | 0 | 0 | 0 | 0.132 | 0 | 0 | 0 | 0 | 0 | 0 | 12.586 | 0 | 12.114 | 0.594 | 0 | 0 | 0 | 50 | 0.635 | 0.363 |
| Tri826_13 | 1.2% | 0.945 | 1.1 | 1.05:0.95 | 1.384 | 24.441 | 0 | 0 | 0 | 0 | 0 | 0.125 | 0 | 0 | 0 | 0 | 0 | 0 | 13.099 | 0 | 10.387 | 0.563 | 0 | 0 | 0 | 50 | 0.638 | 0.363 |
| TF827_13 | 1.2% | 0.81 | 0.9 | 1.1:0.9 | 1.279 | 22.581 | 0 | 0 | 0 | 0 | 0 | 0.135 | 0 | 0 | 0 | 0 | 0 | 0 | 14.792 | 0 | 10.607 | 0.607 | 0 | 0 | 0 | 50 | 0.638 | 0.360 |
| Tri828_13 | 1.2% | 0.9 | 1.0 | 1:1 | 1.364 | 23.902 | 0 | 0 | 0 | 0 | 0 | 0.128 | 0 | 0 | 0 | 0 | 0 | 0 | 12.810 | 0 | 11.227 | 0.578 | 0 | 0 | 0 | 50 | 0.638 | 0.361 |
| Tri829_13 | 1.5% | 0.9 | 1.0 | 1:1 | 1.350 | 23.833 | 0 | 0 | 0 | 0 | 0 | 0.128 | 0 | 0 | 0 | 0 | 0 | 0 | 12.774 | 0 | 11.195 | 0.721 | 0 | 0 | 0 | 50 | 0.641 | 0.357 |
| Tri830_13 | 1.7% | 0.9 | 1.0 | 1:1 | 1.347 | 23.787 | 0 | 0 | 0 | 0 | 0 | 0.128 | 0 | 0 | 0 | 0 | 0 | 0 | 12.749 | 0 | 11.173 | 0.815 | 0 | 0 | 0 | 50 | 0.642 | 0.356 |
| Tri831_13 | 2.0% | 0.9 | 1.0 | 1:1 | 1.343 | 23.720 | 0 | 0 | 0 | 0 | 0 | 0.127 | 0 | 0 | 0 | 0 | 0 | 0 | 12.712 | 0 | 11.141 | 0.957 | 0 | 0 | 0 | 50 | 0.648 | 0.351 |
| Tri832_13 | 1.2% | 0.855 | 1.0 | 0.95:1.05 | 3.964 | 69.999 | 0 | 0 | 0 | 0 | 0 | 0.396 | 0 | 0 | 0 | 0 | 0 | 0 | 37.517 | 0 | 36.341 | 1.783 | 0 | 0 | 0 | 150 | – | – |
| Tri833_13 | 1.2% | 0.81 | 0.9 | 0.95:1.05 | 3.856 | 68.082 | 0 | 0 | 0 | 0 | 0 | 0.406 | 0 | 0 | 0 | 0 | 0 | 0 | 38.516 | 0 | 37.360 | 1.836 | 0 | 0 | 0 | 150 | 0.640 | 0.359 |
| Tf834_13 | 1.2% | 0.855 | 1.0 | 0.95:1.05 | 3.964 | 69.999 | 0 | 0 | 0 | 0 | 0 | 0.396 | 0 | 0 | 0 | 0 | 0 | 0 | 37.517 | 0 | 36.341 | 1.783 | 0 | 0 | 0 | 150 | 0.635 | 0.363 |
| Tri835_13 | 1.2% | 0.81 | 0.9 | 0.95:1.05 | 3.856 | 68.082 | 0 | 0 | 0 | 0 | 0 | 0.406 | 0 | 0 | 0 | 0 | 0 | 0 | 38.516 | 0 | 37.310 | 1.830 | 0 | 0 | 0 | 150 | 0.636 | 0.362 |
| Tri836_13 | 1.2% | 0.855 | 0.9 | 0.9:1.1 | 3.973 | 70.113 | 0 | 0 | 0 | 0 | 0 | 0.396 | 0 | 0 | 0 | 0 | 0 | 0 | 35.600 | 0 | 38.134 | 1.786 | 0 | 0 | 0 | 150 | 0.634 | 0.364 |
| Tf837_13 | 1.2% | 0.9 | 1.0 | 1:1 | 4.061 | 71.706 | 0 | 0 | 0 | 0 | 0 | 0.385 | 0 | 0 | 0 | 0 | 0 | 0 | 38.431 | 0 | 33.682 | 1.735 | 0 | 0 | 0 | 150 | 0.636 | 0.363 |
| Tri838_13 | 2.2% | 0.9 | 1.0 | 1:1 | 1.341 | 23.674 | 0 | 0 | 0 | 0 | 0 | 0.127 | 0 | 0 | 0 | 0 | 0 | 0 | 12.688 | 0 | 11.120 | 1.050 | 0 | 0 | 0 | 50 | 0.652 | 0.347 |
| Tri839_13 | 2.5% | 0.9 | 1.0 | 1:1 | 1.337 | 23.606 | 0 | 0 | 0 | 0 | 0 | 0.127 | 0 | 0 | 0 | 0 | 0 | 0 | 12.652 | 0 | 11.088 | 1.199 | 0 | 0 | 0 | 50 | 0.653 | 0.346 |
| Tri840_13 | 2.7% | 0.9 | 1.0 | 1:1 | 1.334 | 23.561 | 0 | 0 | 0 | 0 | 0 | 0.127 | 0 | 0 | 0 | 0 | 0 | 0 | 12.628 | 0 | 11.067 | 1.283 | 0 | 0 | 0 | 50 | 0.651 | 0.348 |
| Tri841_13 | 3.0% | 0.9 | 1.0 | 1:1 | 1.331 | 23.494 | 0 | 0 | 0 | 0 | 0 | 0.126 | 0 | 0 | 0 | 0 | 0 | 0 | 12.592 | 0 | 11.036 | 1.421 | 0 | 0 | 0 | 50 | 0.553 | 0.346 |
| Tri842_13 | 1.2% | 0.9 | 1.0 | 0.95:1.05 | 1.356 | 23.940 | 0 | 0 | 0 | 0 | 0 | 0.129 | 0 | 0 | 0 | 0 | 0 | 0 | 12.189 | 0 | 11.807 | 0.579 | 0 | 0 | 0 | 50 | 0.639 | 0.365 |
| Tri843_13 | 1.7% | 0.9 | 1.0 | 0.95:1.05 | 1.349 | 23.825 | 0 | 0 | 0 | 0 | 0 | 0.128 | 0 | 0 | 0 | 0 | 0 | 0 | 12.131 | 0 | 11.751 | 0.817 | 0 | 0 | 0 | 50 | 0.642 | 0.357 |
| Tri844_13 | 2.2% | 0.9 | 1.0 | 0.95:1.05 | 1.343 | 23.711 | 0 | 0 | 0 | 0 | 0 | 0.127 | 0 | 0 | 0 | 0 | 0 | 0 | 12.073 | 0 | 11.694 | 1.052 | 0 | 0 | 0 | 50 | 0.648 | 0.351 |
| Tri845_13 | 2.7% | 0.9 | 1.0 | 0.95:1.05 | 1.336 | 23.598 | 0 | 0 | 0 | 0 | 0 | 0.127 | 0 | 0 | 0 | 0 | 0 | 0 | 12.015 | 0 | 11.639 | 1.285 | 0 | 0 | 0 | 50 | 0.652 | 0.347 |
| TF846_13 | 2.0% | 0.92 | 1.0 | 1:1 | 1.069 | 24.121 | 0 | 0 | 0 | 0 | 0 | 0.127 | 0 | 0 | 0 | 0 | 0 | 0 | 12.647 | 0 | 11.084 | 0.952 | 0 | 0 | 0 | 50 | 0.643 | 0.356 |
| Tf847_13 | 2.0% | 0.94 | 1.0 | 1:1 | 0.798 | 24.520 | 0 | 0 | 0 | 0 | 0 | 0.126 | 0 | 0 | 0 | 0 | 0 | 0 | 12.582 | 0 | 11.027 | 0.947 | 0 | 0 | 0 | 50 | 0.644 | 0.355 |

Fig. 12b/3

| Experiment | Composition Ca:Sr:AlSiN:yEu bzw. Sr(Sr,Ca,x)Si,AlN:yEu (a=2x-1) | | EA-share | Si:Al ratio | Ca3N2 | Sr3N2 | BaN₂ | AlF₃ | SrF₂ | BaF₂ | Li₂B₄O₇ | LiBF₄ | LiF | Li₃N | Mn₂O₃ | CuO | Zn₃N₂ | La₂O₃ | Si₃N₄ | Graphite | AlN | Eu₂O₃ | EuN | CeO₂ | SiO₂ | Total | CIE x | CIE y |
|---|---|---|---|---|---|---|---|---|---|---|---|---|---|---|---|---|---|---|---|---|---|---|---|---|---|---|---|
| | x | y | | | | | | | | | | | | | | | | | | | | | | | | | |
| TF848_13 | 0.96 | 2.0% | 1.0 | 1:1 | 0.529 | 24.914 | 0 | 0 | 0 | 0 | 0 | 0.125 | 0 | 0 | 0 | 0 | 0 | 0 | 12.513 | 0 | 10.971 | 0.942 | 0 | 0 | 0 | 50 | 0.638 | 0.360 |
| TF849_13 | 0.98 | 2.0% | 1.0 | 1:1 | 0.263 | 25.304 | 0 | 0 | 0 | 0 | 0 | 0.125 | 0 | 0 | 0 | 0 | 0 | 0 | 12.455 | 0 | 10.916 | 0.937 | 0 | 0 | 0 | 50 | 0.613 | 0.369 |
| TF850_14 | 0.91 | 3.0% | 1.0 | 1:1 | 1.194 | 23.695 | 0 | 0 | 0 | 0 | 0 | 0.126 | 0 | 0 | 0 | 0 | 0 | 0 | 12.560 | 0 | 11.008 | 1.418 | 0 | 0 | 0 | 50 | 0.653 | 0.346 |
| TF851_13 | 0.92 | 3.0% | 1.0 | 1:1 | 1.059 | 23.894 | 0 | 0 | 0 | 0 | 0 | 0.126 | 0 | 0 | 0 | 0 | 0 | 0 | 12.528 | 0 | 10.980 | 1.414 | 0 | 0 | 0 | 50 | 0.652 | 0.347 |
| TF852_13 | 0.93 | 3.0% | 1.0 | 1:1 | 0.924 | 24.092 | 0 | 0 | 0 | 0 | 0 | 0.125 | 0 | 0 | 0 | 0 | 0 | 0 | 12.486 | 0 | 10.952 | 1.410 | 0 | 0 | 0 | 50 | 0.653 | 0.345 |
| TF853_13 | 0.94 | 3.0% | 1.0 | 1:1 | 0.790 | 24.290 | 0 | 0 | 0 | 0 | 0 | 0.125 | 0 | 0 | 0 | 0 | 0 | 0 | 12.464 | 0 | 10.924 | 1.407 | 0 | 0 | 0 | 50 | 0.654 | 0.345 |
| TF854_14 | 0.9 | 3.2% | 1.0 | 1:1 | 1.328 | 23.450 | 0 | 0 | 0 | 0 | 0 | 0.126 | 0 | 0 | 0 | 0 | 0 | 0 | 12.568 | 0 | 11.015 | 1.153 | 0 | 0 | 0 | 50 | 0.656 | 0.343 |
| TF855_14 | 0.9 | 3.5% | 1.0 | 1:1 | 1.324 | 23.383 | 0 | 0 | 0 | 0 | 0 | 0.126 | 0 | 0 | 0 | 0 | 0 | 0 | 12.533 | 0 | 10.984 | 1.650 | 0 | 0 | 0 | 50 | 0.658 | 0.341 |
| TF856_14 | 0.9 | 3.7% | 1.0 | 1:1 | 1.322 | 23.339 | 0 | 0 | 0 | 0 | 0 | 0.125 | 0 | 0 | 0 | 0 | 0 | 0 | 12.509 | 0 | 10.963 | 1.741 | 0 | 0 | 0 | 50 | 0.659 | 0.340 |
| TF857_14 | 0.9 | 4.0% | 1.0 | 1:1 | 1.318 | 23.274 | 0 | 0 | 0 | 0 | 0 | 0.125 | 0 | 0 | 0 | 0 | 0 | 0 | 12.474 | 0 | 10.932 | 1.877 | 0 | 0 | 0 | 50 | 0.660 | 0.339 |
| TF858_14 | 0.91 | 3.0% | 1.0 | 1:1 | 1.194 | 23.695 | 0 | 0 | 0 | 0 | 0 | 0.126 | 0 | 0 | 0 | 0 | 0 | 0 | 12.560 | 0 | 11.008 | 1.418 | 0 | 0 | 0 | 50 | 0.658 | 0.341 |
| TF859_14 | 0.92 | 3.0% | 1.0 | 1:1 | 1.059 | 23.894 | 0 | 0 | 0 | 0 | 0 | 0.126 | 0 | 0 | 0 | 0 | 0 | 0 | 12.528 | 0 | 10.986 | 1.414 | 0 | 0 | 0 | 50 | 0.652 | 0.347 |
| TF860_14 | 0.93 | 3.0% | 1.0 | 1:1 | 0.924 | 24.092 | 0 | 0 | 0 | 0 | 0 | 0.125 | 0 | 0 | 0 | 0 | 0 | 0 | 12.496 | 0 | 10.952 | 1.410 | 0 | 0 | 0 | 50 | 0.652 | 0.347 |
| TF861_14 | 0.94 | 3.0% | 1.0 | 1:1 | 0.790 | 24.290 | 0 | 0 | 0 | 0 | 0 | 0.125 | 0 | 0 | 0 | 0 | 0 | 0 | 12.464 | 0 | 10.924 | 1.407 | 0 | 0 | 0 | 50 | 0.650 | 0.349 |
| TF862_14 | 0.9 | 1.2% | 1.0 | 1:1 | 1.212 | 23.772 | 0.417 | 0 | 0 | 0 | 0 | 0.126 | 0 | 0 | 0 | 0 | 0 | 0 | 12.741 | 0 | 11.166 | 0.575 | 0 | 0 | 0 | 50 | 0.634 | 0.365 |
| TF863_14 | 0.9 | 1.2% | 1.0 | 1:1 | 0.932 | 23.515 | 1.208 | 0 | 0 | 0 | 0 | 0.126 | 0 | 0 | 0 | 0 | 0 | 0 | 12.603 | 0 | 11.046 | 0.569 | 0 | 0 | 0 | 50 | 0.637 | 0.361 |
| TF864_14 | 0.9 | 1.2% | 1.0 | 1:1 | 0.659 | 23.264 | 1.992 | 0 | 0 | 0 | 0 | 0.125 | 0 | 0 | 0 | 0 | 0 | 0 | 12.469 | 0 | 10.928 | 0.563 | 0 | 0 | 0 | 50 | 0.627 | 0.369 |
| TF865_14 | 0.9 | 1.2% | 1.0 | 1:1 | 1.354 | 23.902 | 0 | 0 | 0 | 0 | 0 | 0.128 | 0 | 0 | 0 | 0 | 0 | 0 | 12.859 | 0 | 11.227 | 0.578 | 0 | 0 | 0 | 50 | 0.636 | 0.363 |
| TF866_14 | 0.9 | 2.0% | 1.0 | 1:1 | 4.030 | 71.157 | 0 | 0 | 0 | 0 | 0 | 0.382 | 0 | 0 | 0 | 0 | 0 | 0 | 38.137 | 0 | 33.424 | 2.870 | 0 | 0 | 0 | 150 | 0.645 | 0.353 |
| TF867_14 | 0.92 | 2.0% | 1.0 | 1:1 | 3.207 | 72.364 | 0 | 0 | 0 | 0 | 0 | 0.38 | 0 | 0 | 0 | 0 | 0 | 0 | 37.941 | 0 | 33.252 | 2.855 | 0 | 0 | 0 | 150 | 0.645 | 0.354 |
| TF868_14 | 0.95 | 2.0% | 1.0 | 1:1 | 1.989 | 74.152 | 0 | 0 | 0 | 0 | 0 | 0.377 | 0 | 0 | 0 | 0 | 0 | 0 | 37.651 | 0 | 32.998 | 2.833 | 0 | 0 | 0 | 150 | 0.642 | 0.357 |
| TF869_14 | 0.9 | 2.0% | 1.0 | 1:1 | 1.343 | 23.739 | 0 | 0 | 0 | 0 | 0 | 0.127 | 0 | 0 | 0 | 0 | 0 | 0 | 12.712 | 0 | 11.141 | 0.957 | 0 | 0 | 0 | 50 | 0.645 | 0.353 |
| TF870_14 | 0.9 | 2.0% | 1.0 | 1:1 | 1.343 | 23.719 | 0 | 0 | 0 | 0 | 0 | 0.127 | 0 | 0 | 0 | 0 | 0 | 0 | 12.712 | 0 | 11.141 | 0.957 | 0 | 0 | 0 | 50 | 0.645 | 0.353 |
| TF871_14 | 0.9 | 2.0% | 1.0 | 1:1 | 1.343 | 23.719 | 0 | 0 | 0 | 0 | 0 | 0.127 | 0 | 0 | 0 | 0 | 0 | 0 | 12.712 | 0 | 11.414 | 0.957 | 0 | 0 | 0 | 50 | 0.646 | 0.352 |
| TF872_14 | 0.9 | 2.0% | 1.0 | 1:1 | 1.343 | 23.719 | 0 | 0 | 0 | 0 | 0 | 0.127 | 0 | 0 | 0 | 0 | 0 | 0 | 12.712 | 0 | 11.414 | 0.957 | 0 | 0 | 0 | 50 | 0.646 | 0.353 |
| TF873_14 | 0.9 | 2.0% | 1.0 | 1:1 | 1.358 | 23.634 | 0 | 0 | 0 | 0 | 0 | 0.127 | 0 | 0 | 0 | 0 | 0 | 0 | 12.667 | 0 | 11.102 | 1.132 | 0 | 0 | 0 | 50 | 0.647 | 0.351 |
| TF874_14 | 0.92 | 2.0% | 1.0 | 1:1 | 1.069 | 24.121 | 0 | 0 | 0 | 0 | 0 | 0.127 | 0 | 0 | 0 | 0 | 0 | 0 | 12.647 | 0 | 11.084 | 0.952 | 0 | 0 | 0 | 50 | 0.643 | 0.356 |
| TF875_14 | 0.92 | 2.5% | 1.0 | 1:1 | 1.064 | 24.097 | 0 | 0 | 0 | 0 | 0 | 0.126 | 0 | 0 | 0 | 0 | 0 | 0 | 12.597 | 0 | 11.032 | 1.184 | 0 | 0 | 0 | 50 | 0.647 | 0.352 |

Fig. 12b/3 Continued

| Experiment | Composition $Ca_{1-x}Sr_xAl(Si_{1-y}N_3):yEu$ bzw. $Sr(Sr_xCa_{1-x})Si_5Al_5N_8:yEu$ (a=2x-1) | | EA-share | Si:Al ratio | Weight-in sample/ g | | | | | | | | | | | | | | | Graphit | | | Optical characterisation | |
|---|---|---|---|---|---|---|---|---|---|---|---|---|---|---|---|---|---|---|---|---|---|---|---|---|
| | y | x | | | Ca3N2 | Sr3N2 | BaMx | AlF3 | SrF2 | BaF2 | Li2B4O7 | LiBF4 | LiF | Li3N | Mn2O3 | CuO | Zn3N2 | La2O3 | Si3N4 | e | AlN | Eu2O3 | SnO | CeO2 | SnO2 | Total | CIE x | CIE y |
| TF876_14 | 2.0% | 0.93 | 1.0 | 1:1 | 0.933 | 24.321 | 0 | 0 | 0 | 0 | 0 | 0.126 | 0 | 0 | 0 | 0 | 0 | 0 | 12.615 | 0 | 11.056 | 0.949 | 0 | 0 | 0 | 50 | 0.641 | 0.357 |
| TF877_14 | 2.0% | 0.92 | 1.0 | 1:1 | 3.207 | 72.364 | 0 | 0 | 0 | 0 | 0 | 0.38 | 0 | 0 | 0 | 0 | 0 | 0 | 37.941 | 0 | 33.252 | 2.855 | 0 | 0 | 0 | 150 | 0.644 | 0.354 |
| TF878_14 | 2.0% | 0.93 | 1.0 | 1:1 | 2.799 | 72.963 | 0 | 0 | 0 | 0 | 0 | 0.379 | 0 | 0 | 0 | 0 | 0 | 0 | 37.844 | 0 | 33.167 | 2.848 | 0 | 0 | 0 | 150 | 0.643 | 0.356 |
| TF879_14 | 2.0% | 0.9 | 1.0 | 0.95:1.05 | 4.036 | 71.269 | 0 | 0 | 0 | 0 | 0 | 0.383 | 0 | 0 | 0 | 0 | 0 | 0 | 36.287 | 0 | 35.151 | 2.874 | 0 | 0 | 0 | 150 | 0.646 | 0.353 |
| TF880_14 | 4.2% | 0.9 | 1.0 | 1:1 | 1.316 | 23.230 | 0 | 0 | 0 | 0 | 0 | 0.125 | 0 | 0 | 0 | 0 | 0 | 0 | 12.450 | 0 | 10.915 | 1.967 | 0 | 0 | 0 | 50 | 0.661 | 0.338 |
| TF881_14 | 4.5% | 0.9 | 1.0 | 1:1 | 1.312 | 23.165 | 0 | 0 | 0 | 0 | 0 | 0.124 | 0 | 0 | 0 | 0 | 0 | 0 | 12.415 | 0 | 10.881 | 2.102 | 0 | 0 | 0 | 50 | 0.662 | 0.337 |
| TF882_14 | 4.7% | 0.9 | 1.0 | 1:1 | 1.309 | 23.122 | 0 | 0 | 0 | 0 | 0 | 0.124 | 0 | 0 | 0 | 0 | 0 | 0 | 12.392 | 0 | 10.861 | 2.191 | 0 | 0 | 0 | 50 | 0.663 | 0.336 |
| TF883_14 | 5.0% | 0.9 | 1.0 | 1:1 | 1.306 | 23.057 | 0 | 0 | 0 | 0 | 0 | 0.124 | 0 | 0 | 0 | 0 | 0 | 0 | 12.358 | 0 | 10.831 | 2.325 | 0 | 0 | 0 | 50 | 0.664 | 0.334 |
| TF884_14 | 2.5% | 0.93 | 1.0 | 1:1 | 2.786 | 72.618 | 0 | 0 | 0 | 0 | 0 | 0.377 | 0 | 0 | 0 | 0 | 0 | 0 | 37.665 | 0 | 33.101 | 3.543 | 0 | 0 | 0 | 150 | 0.649 | 0.349 |
| TF885_14 | 3.0% | 0.93 | 1.0 | 1:1 | 2.773 | 72.277 | 0 | 0 | 0 | 0 | 0 | 0.376 | 0 | 0 | 0 | 0 | 0 | 0 | 37.488 | 0 | 32.855 | 4.231 | 0 | 0 | 0 | 150 | 0.652 | 0.347 |
| TF886_14 | 2.0% | 0.94 | 1.0 | 1:1 | 2.393 | 73.559 | 0 | 0 | 0 | 0 | 0 | 0.378 | 0 | 0 | 0 | 0 | 0 | 0 | 37.747 | 0 | 33.072 | 2.840 | 0 | 0 | 0 | 150 | 0.643 | 0.355 |
| TF887_14 | 0.8% | 0.93 | 1.0 | 1:1 | 0.944 | 24.601 | 0 | 0 | 0 | 0 | 0 | 0.128 | 0 | 0 | 0 | 0 | 0 | 0 | 12.760 | 0 | 11.183 | 0.384 | 0 | 0 | 0 | 50 | 0.622 | 0.377 |
| TF888_14 | 0.4% | 0.93 | 1.0 | 1:1 | 0.916 | 23.868 | 0.404 | 0 | 0 | 0 | 0 | 0.124 | 0 | 0 | 0 | 0 | 0 | 0 | 12.380 | 0 | 10.850 | 1.863 | 0 | 0 | 0 | 50 | 0.607 | 0.391 |
| TF889_14 | 2.0% | 0.9 | 1.0 | 1:1 | 1.202 | 23.591 | 0 | 0 | 0 | 0 | 0 | 0.127 | 0 | 0 | 0 | 0 | 0 | 0 | 12.644 | 0 | 11.081 | 0.951 | 0 | 0 | 0 | 50 | 0.644 | 0.355 |
| TF890_41 | 0.0% | 0.9 | 1.0 | 1:1 | 1.357 | 23.950 | 0 | 0 | 0 | 0 | 0 | 0.129 | 0 | 0 | 0 | 0 | 0 | 0 | 12.838 | 0 | 11.251 | 0.080 | 0.472 | 0 | 0 | 50 | 0.452 | 0.524 |
| TF891_14 | 2.0% | 0.94 | 1.0 | 1:1 | 0.928 | 24.455 | 0 | 0 | 0 | 0 | 0 | 0.126 | 0 | 0 | 0 | 0 | 0 | 0 | 12.549 | 0 | 10.998 | 0.944 | 0 | 0 | 0 | 50 | 0.642 | 0.356 |
| TF892_14 | 2.0% | 0.95 | 1.0 | 1:1 | 0.923 | 24.587 | 0 | 0 | 0 | 0 | 0 | 0.125 | 0 | 0 | 0 | 0 | 0 | 0 | 12.484 | 0 | 10.941 | 0.939 | 0 | 0 | 0 | 50 | 0.641 | 0.358 |
| TF893_14 | 2.0% | 0.97 | 1.0 | 1:1 | 0.914 | 24.847 | 0 | 0 | 0 | 0 | 0 | 0.124 | 0 | 0 | 0 | 0 | 0 | 0 | 12.356 | 0 | 10.829 | 0.930 | 0 | 0 | 0 | 50 | 0.640 | 0.358 |
| TF894_14 | 0.8% | 0.93 | 1.0 | 1:1 | 0.944 | 24.601 | 0 | 0 | 0 | 0 | 0 | 0.128 | 0 | 0 | 0 | 0 | 0 | 0 | 12.760 | 0 | 11.183 | 0.384 | 0 | 0 | 0 | 50 | 0.622 | 0.376 |
| TF895_14 | 1.2% | 0.93 | 1.0 | 1:1 | 0.940 | 24.507 | 0 | 0 | 0 | 0 | 0 | 0.127 | 0 | 0 | 0 | 0 | 0 | 0 | 12.711 | 0 | 11.140 | 0.574 | 0 | 0 | 0 | 50 | 0.631 | 0.367 |
| TF896_14 | 2.5% | 0.93 | 1.0 | 1:1 | 0.929 | 24.206 | 0 | 0 | 0 | 0 | 0 | 0.126 | 0 | 0 | 0 | 0 | 0 | 0 | 12.555 | 0 | 11.003 | 1.181 | 0 | 0 | 0 | 50 | 0.648 | 0.351 |
| TF897_14 | 2.5% | 0.93 | 1.0 | 1:1 | 0.920 | 23.980 | 0 | 0 | 0 | 0 | 0 | 0.125 | 0 | 0 | 0 | 0 | 0 | 0 | 12.428 | 0 | 10.900 | 1.638 | 0 | 0 | 0 | 50 | 0.654 | 0.344 |
| TF898_14 | 2.5% | 0.93 | 1.0 | 1:1 | 2.789 | 72.618 | 0 | 0 | 0 | 0 | 0 | 0.377 | 0 | 0 | 0 | 0 | 0 | 0 | 37.665 | 0 | 33.010 | 3.543 | 0 | 0 | 0 | 150 | 0.659 | 0.340 |
| TF899_14 | 2.5% | 0.93 | 1.0 | 1:1 | 2.786 | 72.618 | 0 | 0 | 0 | 0 | 0 | 0.377 | 0 | 0 | 0 | 0 | 0 | 0 | 37.665 | 0 | 33.010 | 3.543 | 0 | 0 | 0 | 150 | 0.649 | 0.350 |
| TF900_14 | 2.5% | 0.93 | 1.0 | 1:1 | 2.786 | 72.618 | 0 | 0 | 0 | 0 | 0 | 0.377 | 0 | 0 | 0 | 0 | 0 | 0 | 37.665 | 0 | 33.010 | 3.543 | 0 | 0 | 0 | 150 | 0.650 | 0.349 |
| TF901_14 | 2.5% | 0.93 | 1.0 | 1:1 | 2.786 | 72.618 | 0 | 0 | 0 | 0 | 0 | 0.377 | 0 | 0 | 0 | 0 | 0 | 0 | 37.665 | 0 | 33.010 | 3.543 | 0 | 0 | 0 | 150 | 0.650 | 0.349 |
| TF902_14 | 3.0% | 0.93 | 1.0 | 1:1 | 2.773 | 72.277 | 0 | 0 | 0 | 0 | 0 | 0.376 | 0 | 0 | 0 | 0 | 0 | 0 | 37.488 | 0 | 32.855 | 4.231 | 0 | 0 | 0 | 150 | 0.654 | 0.345 |
| TF903_14 | 3.0% | 0.93 | 1.0 | 1:1 | 4.030 | 71.157 | 0 | 0 | 0 | 0 | 0 | 0.382 | 0 | 0 | 0 | 0 | 0 | 0 | 38.137 | 0 | 33.424 | 2.870 | 0 | 0 | 0 | 150 | 0.646 | 0.352 |
| TF904_14 | 3.0% | 0.93 | 1.0 | 1:1 | 2.773 | 72.277 | 0 | 0 | 0 | 0 | 0 | 0.376 | 0 | 0 | 0 | 0 | 0 | 0 | 37.488 | 0 | 32.855 | 4.231 | 0 | 0 | 0 | 150 | 0.653 | 0.346 |
| TF905_14 | 3.0% | 0.94 | 1.0 | 1:1 | 2.371 | 72.869 | 0 | 0 | 0 | 0 | 0 | 0.375 | 0 | 0 | 0 | 0 | 0 | 0 | 37.939 | 0 | 32.772 | 4.221 | 0 | 0 | 0 | 150 | 0.653 | 0.346 |
| TF906_14 | 3.0% | 0.96 | 1.0 | 1:1 | 1.572 | 74.044 | 0 | 0 | 0 | 0 | 0 | 0.373 | 0 | 0 | 0 | 0 | 0 | 0 | 37.204 | 0 | 32.607 | 4.199 | 0 | 0 | 0 | 150 | | |

| Experiment | Composition Ca₁₋ₓSrₓAlSiN₃:yEu b/zw Sr₁Sr₂₋ₐCa₂ₐ₋₁SiₐAlₓN₄₋ᵧyEu (a=2x-1) | | | | | Weight-in sample / g | | | | | | | | | | | | | | | | Graphit | | Optical characterisation | |
|---|---|---|---|---|---|---|---|---|---|---|---|---|---|---|---|---|---|---|---|---|---|---|---|---|---|
| | y | x | EA-share | Si:Al ratio | Ca₃N₂ | Sr₃N₂ | BaN₆ | AlF₃ | SrF₂ | BaF₂ | Li₂B₄O₇ | LiBF₄ | LiF | Li₃N | Mn₂O₃ | CuO | Zn₃N₂ | La₂O₃ | Si₃N₄ | e | AlN | Eu₂O₃ | EuN | CeO₂ | SiO₂ | Total | CIE x | CIE y |
| TF 922_14 | 3.0% | 0.93 | 1.0 | 0.985:1 | 2.783 | 72.549 | 0 | 0 | 0 | 0 | 0 | 0.377 | 0 | 0 | 0 | 0 | 0 | 0 | 37.065 | 0 | 32.979 | 4.247 | 0 | 0 | 0 | 150 | 0.653 | 0.346 |
| TF 923_14 | 3.0% | 0.93 | 1.0 | 0.985:0.98 | 2.792 | 72.789 | 0 | 0 | 0 | 0 | 0 | 0.379 | 0 | 0 | 0 | 0 | 0 | 0 | 37.187 | 0 | 32.592 | 4.261 | 0 | 0 | 0 | 150 | 0.652 | 0.347 |
| TF 924_14 | 3.0% | 0.93 | 1.0 | 1:0.985 | 2.782 | 72.515 | 0 | 0 | 0 | 0 | 0 | 0.377 | 0 | 0 | 0 | 0 | 0 | 0 | 37.612 | 0 | 32.469 | 4.245 | 0 | 0 | 0 | 150 | 0.653 | 0.347 |
| | | | | 0.995:0.99 | | | | | | | | | | | | | | | | | | | | | | | | |
| Thi 925_14 | 3.0% | 0.93 | 1.0 | 5 | 2.779 | 72.447 | 0 | 0 | 0 | 0 | 0 | 3.77 | 0 | 0 | 0 | 0 | 0 | 0 | 37.388 | 0 | 32.768 | 4.241 | 0 | 0 | 0 | 150 | 0.653 | 0.347 |
| Thi 926_14 | 3.0% | 0.93 | 1.0 | 0.985:1.01 | 2.774 | 72.308 | 0 | 0 | 0 | 0 | 0 | 0.376 | 0 | 0 | 0 | 0 | 0 | 0 | 37.110 | 0 | 33.198 | 4.233 | 0 | 0 | 0 | 150 | 0.652 | 0.347 |
| Thi 927_14 | 3.0% | 0.93 | 1.0 | 1:1.015 | 2.764 | 72.040 | 0 | 0 | 0 | 0 | 0 | 0.374 | 0 | 0 | 0 | 0 | 0 | 0 | 37.365 | 0 | 33.239 | 4.218 | 0 | 0 | 0 | 150 | 0.652 | 0.347 |
| | | | | 1.015:1.03 | | | | | | | | | | | | | | | | | | | | | | | | |
| Thi 928_14 | 3.0% | 0.93 | 1.0 | 5 | 2.753 | 71.772 | 0 | 0 | 0 | 0 | 0 | 0.373 | 0 | 0 | 0 | 0 | 0 | 0 | 37.785 | 0 | 33.115 | 4.202 | 0 | 0 | 0 | 150 | 0.653 | 0.345 |
| | | | | 0.985:1.00 | | | | | | | | | | | | | | | | | | | | | | | | |
| Thi 929_14 | 3.0% | 0.93 | 1.0 | 5 | 2.780 | 72.469 | 0 | 0 | 0 | 0 | 0 | 0.377 | 0 | 0 | 0 | 0 | 0 | 0 | 37.024 | 0 | 33.104 | 4.243 | 0 | 0 | 0 | 150 | 0.652 | 0.347 |
| Thi 930_14 | 3.0% | 0.93 | 1.0 | 0.99:0.985 | 2.783 | 72.698 | 0 | 0 | 0 | 0 | 0 | 0.378 | 0 | 0 | 0 | 0 | 0 | 0 | 37.329 | 0 | 32.551 | 4.256 | 0 | 0 | 0 | 150 | 0.652 | 0.647 |
| Thi 931_14 | 3.0% | 0.93 | 1.0 | 0.985:1.01 | 2.777 | 72.390 | 0 | 0 | 0 | 0 | 0 | 0.376 | 0 | 0 | 0 | 0 | 0 | 0 | 36.983 | 0 | 33.235 | 4.238 | 0 | 0 | 0 | 150 | 0.652 | 0.347 |
| Thi 932_14 | 3.0% | 0.93 | 1.0 | 0.985:1.01 | 2.776 | 72.209 | 0 | 0 | 0 | 0 | 0 | 0.375 | 0 | 0 | 0 | 0 | 0 | 0 | 37.265 | 0 | 33.152 | 4.227 | 0 | 0 | 0 | 150 | 0.652 | 0.347 |
| Thi 933_14 | 3.0% | 0.93 | 1.0 | 1.01:1.01 | 2.760 | 71.940 | 0 | 0 | 0 | 0 | 0 | 0.374 | 0 | 0 | 0 | 0 | 0 | 0 | 37.686 | 0 | 33.028 | 4.212 | 0 | 0 | 0 | 150 | 0.652 | 0.347 |
| Thi 934_14 | 3.0% | 0.93 | 1.0 | 0.995:0.99 | 2.782 | 72.526 | 0 | 0 | 0 | 0 | 0 | 0.377 | 0 | 0 | 0 | 0 | 0 | 0 | 37.429 | 0 | 32.639 | 4.246 | 0 | 0 | 0 | 150 | 0.655 | 0.344 |
| | | | | 1.105:1.00 | | | | | | | | | | | | | | | | | | | | | | | | |
| Thi 935_14 | 3.0% | 0.93 | 1.0 | 5 | 2.772 | 72.244 | 0 | 0 | 0 | 0 | 0 | 0.376 | 0 | 0 | 0 | 0 | 0 | 0 | 39.347 | 0 | 32.347 | 4.229 | 0 | 0 | 0 | 150 | 0.654 | 0.345 |
| | | | | 1.015:0.99 | | | | | | | | | | | | | | | | | | | | | | | | |
| Thi 936_14 | 3.0% | 0.93 | 1.0 | 5 | 2.771 | 72.266 | 0 | 0 | 0 | 0 | 0 | 0.376 | 0 | 0 | 0 | 0 | 0 | 0 | 37.670 | 0 | 32.686 | 4.231 | 0 | 0 | 0 | 150 | 0.653 | 0.346 |
| | | | | 0.985:1.10 | | | | | | | | | | | | | | | | | | | | | | | | |
| Thi 937_14 | 3.0% | 0.93 | 1.0 | 5 | 2.774 | 72.311 | 0 | 0 | 0 | 0 | 0 | 0.376 | 0 | 0 | 0 | 0 | 0 | 0 | 36.943 | 0 | 33.363 | 4.233 | 0 | 0 | 0 | 150 | 0.654 | 0.345 |
| | | | | 1.015:1.00 | | | | | | | | | | | | | | | | | | | | | | | | |
| Thi 938_14 | 3.0% | 0.93 | 1.0 | 5 | 2.766 | 72.108 | 0 | 0 | 0 | 0 | 0 | 0.375 | 0 | 0 | 0 | 0 | 0 | 0 | 37.587 | 0 | 32.942 | 4.221 | 0 | 0 | 0 | 150 | 0.653 | 0.346 |
| Thi 939_14 | 3.0% | 0.93 | 1.0 | 1.015:1 | 2.752 | 72.007 | 0 | 0 | 0 | 0 | 0 | 0.374 | 0 | 0 | 0 | 0 | 0 | 0 | 37.908 | 0 | 32.732 | 4.216 | 0 | 0 | 0 | 150 | 0.651 | 0.348 |
| TF 940_14 | 3.0% | 0.93 | 1.0 | 1.015:0.99 | 2.769 | 72.165 | 0 | 0 | 0 | 0 | 0 | 0.375 | 0 | 0 | 0 | 0 | 0 | 0 | 37.991 | 0 | 32.476 | 4.225 | 0 | 0 | 0 | 150 | 0.653 | 0.346 |
| TF 941_14 | 3.0% | 0.93 | 1.0 | 1.01:0.985 | 2.775 | 72.334 | 0 | 0 | 0 | 0 | 0 | 0.376 | 0 | 0 | 0 | 0 | 0 | 0 | 37.893 | 0 | 32.388 | 4.235 | 0 | 0 | 0 | 150 | 0.653 | 0.346 |
| TF 942_14 | 3.0% | 0.93 | 1.0 | 0.91:1.015 | 2.837 | 73.981 | 0 | 0 | 0 | 0 | 0 | 0.384 | 0 | 0 | 0 | 0 | 0 | 0 | 34.488 | 0 | 34.088 | 4.325 | 0 | 0 | 0 | 150 | 0.650 | 0.348 |
| | | | | 1.015:1.00 | | | | | | | | | | | | | | | | | | | | | | | | |
| Thi 943_14 | 3.0% | 0.93 | 1.0 | 5 | 2.759 | 71.929 | 0 | 0 | 0 | 0 | 0 | 0.374 | 0 | 0 | 0 | 0 | 0 | 0 | 37.867 | 0 | 32.860 | 4.211 | 0 | 0 | 0 | 150 | 0.653 | 0.346 |
| Thi 944_14 | 3.0% | 0.93 | 1.0 | 0.99:1 | 2.780 | 72.458 | 0 | 0 | 0 | 0 | 0 | 0.377 | 0 | 0 | 0 | 0 | 0 | 0 | 37.206 | 0 | 32.937 | 4.242 | 0 | 0 | 0 | 150 | 0.651 | 0.345 |
| | | | | 1.015:0.99 | | | | | | | | | | | | | | | | | | | | | | | | |
| Thi 945_14 | 3.0% | 0.93 | 1.0 | 5 | 2.766 | 72.086 | 0 | 0 | 0 | 0 | 0 | 0.375 | 0 | 0 | 0 | 0 | 0 | 0 | 37.950 | 0 | 32.604 | 4.220 | 0 | 0 | 0 | 150 | 0.653 | 0.345 |
| Thi 946_14 | 3.0% | 0.93 | 1.0 | 0.95:0.99 | 2.814 | 73.354 | 0 | 0 | 0 | 0 | 0 | 0.381 | 0 | 0 | 0 | 0 | 0 | 0 | 36.144 | 0 | 33.011 | 4.294 | 0 | 0 | 0 | 150 | 0.653 | 0.346 |
| | | | | 0.995:1.01 | | | | | | | | | | | | | | | | | | | | | | | | |
| Thi 947_14 | 3.0% | 0.93 | 1.0 | 5 | 2.767 | 72.130 | 0 | 0 | 0 | 0 | 0 | 0.375 | 0 | 0 | 0 | 0 | 0 | 0 | 37.225 | 0 | 33.280 | 4.223 | 0 | 0 | 0 | 150 | 0.654 | 0.345 |
| Thi 948_14 | 3.0% | 0.93 | 1.0 | 1:1.005 | 2.770 | 72.198 | 0 | 0 | 0 | 0 | 0 | 0.375 | 0 | 0 | 0 | 0 | 0 | 0 | 37.467 | 0 | 32.983 | 4.227 | 0 | 0 | 0 | 150 | 0.654 | 0.345 |

Fig. 12b/4 Continued

Composition: $Ca_xSr_xAlSiN_3:yEu$ bzw $SrtSr_xCa_{1-x}SiAl_xN_x:yEu$ ($n=2x-1$)

| Experiment | x | y | EA-share | Si:Al ratio | Ca3N2 | Sr3N2 | BaN$_x$ | AlF3 | SrF2 | BaF2 | Li2B4O7 | LiBF4 | LiF | U3N | Mn2O3 | CuO | Zn3N2 | La2O3 | Si3N4 | Graphit c | AlN | Eu2O3 | EuN | CeO2 | SiO2 | Total | CIE x | CIE y |
|---|---|---|---|---|---|---|---|---|---|---|---|---|---|---|---|---|---|---|---|---|---|---|---|---|---|---|---|---|
| TF 949_14 | 0.93 | 3.0% | 1.0 | 1.033:1.06 | 2.731 | 70.672 | 0 | 0 | 0 | 0 | 0 | 0.367 | 0 | 0 | 0 | 0 | 0 | 0 | 37.865 | 0 | 34.246 | 4.137 | 0 | 0 | 0 | 150 | 0.653 | 0.346 |
| TF 950_14 | 0.93 | 3.0% | 1.0 | 1.066:1.13 | 2.652 | 69.138 | 0 | 0 | 0 | 0 | 0 | 0.359 | 0 | 0 | 0 | 0 | 0 | 0 | 38.226 | 0 | 35.577 | 4.048 | 0 | 0 | 0 | 150 | 0.652 | 0.346 |
| TF 951_14 | 0.93 | 3.0% | 1.0 | 2 | 2.594 | 67.625 | 0 | 0 | 0 | 0 | 0 | 0.352 | 0 | 0 | 0 | 0 | 0 | 0 | 38.582 | 0 | 36.288 | 3.959 | 0 | 0 | 0 | 150 | 0.654 | 0.345 |
| TF 952_14 | 0.93 | 3.0% | 1.0 | 1.11:1.2 | 1.121 | 71.105 | 0 | 0 | 0 | 0 | 0 | 0.354 | 0 | 0 | 0 | 0 | 0 | 0 | 37.481 | 0.500 | 35.948 | 3.991 | 0 | 0 | 0 | 150 | - | - |
| TF 953_14 | 0.93 | 3.0% | 1.0 | 1.06:1.16 | 2.770 | 72.209 | 0 | 0 | 0 | 0 | 0 | 0.375 | 0 | 0 | 0 | 0 | 0 | 0 | 37.265 | 0 | 33.150 | 4.231 | 0 | 0 | 0 | 150 | 0.653 | 0.346 |
| TF 954_14 | 0.93 | 3.0% | 1.0 | 0.995:1.01 | 2.773 | 72.277 | 0 | 0 | 0 | 0 | 0 | 0.376 | 0 | 0 | 0 | 0 | 0 | 0 | 37.488 | 0 | 32.855 | 4.231 | 0 | 0 | 0 | 150 | 0.664 | 0.345 |
| TM 044_14 | 0.93 | 3.0% | 1.0 | 1:1 | 2.770 | 72.198 | 0 | 0 | 0 | 0 | 0 | 0.375 | 0 | 0 | 0 | 0 | 0 | 0 | 37.447 | 0 | 32.983 | 4.227 | 0 | 0 | 0 | 150 | 0.651 | 0.348 |
| TM 045_14 | 0.93 | 3.0% | 1.0 | 1:1.005 | 2.767 | 72.119 | 0 | 0 | 0 | 0 | 0 | 0.375 | 0 | 0 | 0 | 0 | 0 | 0 | 37.406 | 0 | 33.111 | 4.222 | 0 | 0 | 0 | 150 | 0.653 | 0.346 |
| TM 046_14 | 0.93 | 3.0% | 1.0 | 1:1.01 | 2.764 | 72.040 | 0 | 0 | 0 | 0 | 0 | 0.374 | 0 | 0 | 0 | 0 | 0 | 0 | 37.365 | 0 | 33.239 | 4.218 | 0 | 0 | 0 | 150 | 0.651 | 0.348 |
| TM 047_14 | 0.93 | 3.0% | 1.0 | 1:1.015 | 2.767 | 72.119 | 0 | 0 | 0 | 0 | 0 | 0.375 | 0 | 0 | 0 | 0 | 0 | 0 | 37.406 | 0 | 33.111 | 4.222 | 0 | 0 | 0 | 150 | 0.652 | 0.347 |
| TM 048_14 | 0.93 | 3.0% | 1.0 | 1:1.01 | 2.767 | 72.119 | 0 | 0 | 0 | 0 | 0 | 0.375 | 0 | 0 | 0 | 0 | 0 | 0 | 37.406 | 0 | 33.111 | 4.222 | 0 | 0 | 0 | 150 | 0.653 | 0.346 |
| TM 049_14 | 0.93 | 3.0% | 1.0 | 1:1.01 | 2.767 | 72.119 | 0 | 0 | 0 | 0 | 0 | 0.375 | 0 | 0 | 0 | 0 | 0 | 0 | 37.406 | 0 | 33.111 | 4.222 | 0 | 0 | 0 | 150 | 0.652 | 0.347 |

PHOSPHOR PARTICLES WITH A PROTECTIVE LAYER, AND METHOD FOR PRODUCING THE PHOSPHOR PARTICLES WITH THE PROTECTIVE LAYER

CROSS-REFERENCE TO RELATED APPLICATIONS

This is a continuation application of U.S. application Ser. No. 15/556,279, entitled "Phosphor Particles with a Protective Layer, and Method for Producing the Phosphor Particles with the Protective Layer," which was filed on Sep. 6, 2017 and issued as U.S. Pat. No. 10,738,238 on Aug. 11, 2020, which is a national phase filing under section 371 of PCT/EP2016/054327 filed Mar. 1, 2016, which claims the priority of German patent application 102015103326.7 filed Mar. 6, 2015, all of which are incorporated herein by reference in its entirety.

TECHNICAL FIELD

Phosphors that are able to convert primary radiation by means of radiation conversion into converted radiation, secondary radiation with a longer wavelength, are often very sensitive to hydrolysis. Due to the hydrolysis of the phosphors, many light apparatuses in which a phosphor is arranged in the beam path of a primary radiation source can therefore change their color point in an undesired manner over time. Furthermore, the conversion efficiency of the phosphor often decreases sharply on account of the hydrolysis of the phosphor.

BACKGROUND

To reduce such problems, it is known to protect phosphors with silicon dioxide layers, which can be applied to the phosphor particles by hydrolysis of tetraethoxysilane (TEOS) in liquid solution, for example. Another possibility is the deposition of a coating material by means of chemical vapor deposition (CVD). However, such methods are very time-consuming and costly, as separate chemicals have to be provided for the vapor deposition or the deposition of a silicon dioxide layer.

The production of a protective layer on a phosphor particle is known from US application US 2006/0263627, wherein large quantities of acid are added to form a coating. However, this method can easily lead to the disintegration of a large proportion of the phosphor, as a large quantity of acid is normally added.

The subject matter of the present invention consists in providing a method for the production of phosphor particles of an Si-containing and/or Al-containing phosphor with a protective layer and in providing an Si-containing and/or Al-containing phosphor with a protective layer, which is improved with reference to the aforesaid technical problems.

Advantageous configurations of the method for the production of the phosphor particles and advantageous configurations of the novel phosphor particles with the protective layer are the subject of further dependent claims.

SUMMARY OF THE INVENTION

Embodiments of the invention provide a method for producing phosphor particles of an Si-containing and/or Al-containing phosphor with a protective layer, the method comprising:

A) Treatment of the silicon-containing and/or aluminum-containing phosphor with an acid solution, wherein the pH value of the acid solution is maintained within a range of pH 3.5 to 7 for a period of at least one hour and wherein a silicon-containing layer is formed on the phosphor particles, which layer has a higher content of silicon on the surface than the phosphor particles and/or an aluminum-containing layer is formed on the phosphor particles, which layer has a modified content of aluminum on the surface compared with the phosphor particles, B) Tempering of the treated phosphor particles at a temperature of at least 100° C., producing the protective layer.

Here and in the following, the description "phosphor" includes, in addition to a pure phosphor, also mixtures of phosphor phases, which as well as a main phase possibly additionally comprise secondary or subsidiary phases and are suitable for converting a primary radiation into a secondary radiation by radiation conversion.

In contrast to conventional acid treatment methods, in this method according to the invention the pH value of the acid solution is maintained over a certain period of at least one hour in a more narrowly defined pH value range of 3.5 to 7. Surprisingly, a method of this kind leads to significantly increased stability of the phosphor particles against hydrolysis, so that phosphors provided with a protective layer by the method according to the invention are also suitable for applications in environments with high air humidity.

In this case the pH value is preferably set between 4 and 6.5, more preferably between a pH value of 4.5 and 6 over a period of at least preferably three hours, more preferably at least four hours. The overall period of acid treatment can vary in a framework of two to seven hours, preferably four to five hours.

The inventors have established that in such pH ranges, a partial degradation of easily degradable main and/or secondary phases of the phosphor occurs in a particularly controlled manner and the pH value then changes quickly. The pH value can start in this case with a very small value, typically a pH value <2, wherein, however, due to the method according to the invention, the pH value is then maintained within the aforesaid ranges over a longer period in order to cause a particularly controlled reaction of the phosphor with the acid solution.

During the method step A), hydroxydic compounds in particular of the elements present in the phosphor can be formed, which can then be converted by the tempering in step B) into the protective layer, wherein cross-linking of the hydroxydic compounds can occur with the elimination of water. The tempering can take place preferably at temperatures between 200° C. and 450° C., wherein temperatures in particular between 250° C. and 400° C., preferably of 300° C. to 350° C. can be selected. The tempering can also take place between 300° C. and 450° C.

The Si-containing layer formed in method step A), which has a modified content of aluminum on the surface compared with the phosphor particles, can have a reduced content of Al in particular.

During the method step A), the phosphor particles are preferably introduced in an acid solution, for example, an aqueous acid solution, into a receptacle, for example, a glass receptacle, and a suspension is then formed by stirring. In method step A) mineral acids in particular such as hydrochloric acid and/or organic acids such as acetic acid can be used.

Furthermore, the suspension can be maintained at a temperature of 20° C. to 100° C., preferably 50 to 90° C., more preferably 75 to 85° C. The period for the acid treatment in this case can be between one and ten hours, preferably two to seven hours, more preferably four to five hours.

In method step A) at least one of the following methods can be applied for pH control:
- addition of an acid as a function of the pH value of the acid solution,
- addition of a buffer solution,
- addition of a defined quantity of acid solution as a function of the quantity of phosphor.

In the case of adding an acid as a function of the pH value of the acid solution, a dosing pump can be used in particular, which is connected to a pH-meter, wherein the acid solution is then added as a function of the measured pH value and the pH value is kept within the range already cited above by this.

When using a buffer solution, for example, an acetic acid/acetate buffer solution, a defined quantity of a buffer solution is added, the pH value of which can be set by adjusting the quantities of acid and corresponding base. For example, an acetic acid/acetate buffer with equimolar quantities of acid and base has a pH value of 4.76.

Another option for a buffer solution is a citrate buffer based on citric acid or a carbonic acid-silicate buffer.

Another possibility for setting a targeted pH value range during the acid treatment of the phosphor particles consists in adding a defined quantity of acid solution as a function of the quantity of phosphor particles. In this method variant the pH value changes very quickly at the start of the reaction and then stabilizes to the desired value or within a desired pH value range. It is advantageous here to determine by experiments for each phosphor and different quantities of phosphor how much acid solution must be added, so that the pH value stabilizes in the desired range.

The aforesaid variant of adding the acid solution as a function of the pH value is preferable, as the pH value can be controlled especially well by this method variant during the entire method step A).

According to an advantageous embodiment of a method according to the invention, the tempering in method step B) can be carried out at temperatures between 300 and 350° C. Phosphor particles with a protective layer that are especially stable and thus hydrolysis-resistant can be produced particularly well at such temperatures.

Furthermore, in method step B) the tempering can also be carried out in an atmosphere containing oxygen, so that the option also exists of incorporating further oxygen into the protective layer that forms during the tempering. The environment of the phosphor particles during the tempering can preferably contain air or mixtures of air and other gases, for example, nitrogen, inert gases, oxygen. During the tempering a wide range can be used as far as the heating rate is concerned, and in particular the heating rate during tempering can be between 1° C./h and 100° C./h, preferably between 5° C./h and 50° C./h, more preferably between 10° C./h and 20° C./h.

Between the method step A) and the tempering in method step B) a method step A1) can also be present, in which the phosphor particles are dried after the acid treatment for two to 20 hours at 40 to 100° C. Screening of the phosphor particles is then also possible.

Furthermore, the phosphor particles can be filtered off from the acid solution, the suspension using a suction filter and then washed thoroughly with water and also with ethanol.

In another embodiment of a method according to the invention, a silicon-containing and/or aluminum-containing phosphor is used, which in addition has alkaline earth ions and wherein in method step A) a layer is formed on the phosphor particles that has a lower content of alkaline earth ions than the phosphor particles.

The inventors have established that when using a silicon-containing and/or aluminum-containing phosphor, which additionally has alkaline earth ions, the alkaline earth ions are especially preferably removed in method step A) from surface regions of the phosphor particles and a protective layer is then formed that has a lower content of alkaline earth ions compared with the phosphor located under the protective layer.

The phosphor particles provided with a protective layer by a method according to the invention can in particular comprise a silicon-containing and/or aluminum-containing phosphor, wherein the protective layer located on the phosphor has an atomic percentage content of silicon that is increased by at least 40%, preferably by at least 60%, compared with the phosphor and/or a content of aluminum that is reduced by at least 10 at. %, preferably by at least 20 at. %, compared with the phosphor.

It was determined in particular that in the acid treatment step, method step A), the content of silicon of the protective layer increases, while the content of aluminum on the surface of the phosphor is reduced by the acid treatment step.

In method step A) of the acid treatment, surface regions in particular of the phosphor particles are leached out by the acid, wherein the elements present in the phosphor react differently with the acid solution and silicon is enriched, for example, while aluminum tends to be reduced compared with the phosphor located under the protective layer and not attacked by the acid.

Furthermore, the phosphor particles can additionally also comprise alkaline earth ions and the protective layer can have a content of alkaline earth ions that is reduced by at least 40%, preferably by at least 60% compared with the phosphor. As already discussed above, alkaline earth ions as a constituent of the phosphor particles tend to be washed out by the acid treatment, so that their content is reduced in the protective layer compared with phosphor not leached out by acids.

In another embodiment of the present invention, the phosphor particles additionally contain nitrogen, wherein the protective layer formed by the method according to the invention from the phosphor has a content of nitrogen that is reduced by at least 40 at. %, preferably by at least 60 at. % compared with the phosphor. In particular, it was determined that the content of nitrogen is reduced in the acid treatment step A) to a similarly strong extent as the content of alkaline earth ions, in particular calcium, strontium and barium.

According to another embodiment of phosphor particles produced by the method according to the invention, the silicon content of the protective layer can be increased by roughly 40 to a maximum of 80 at. % compared with the phosphor located under the protective layer. In contrast to this, the aluminum content of the protective layer can be reduced by roughly 10 to a maximum of 50 at. %, or also 10 at. % to 30 at. % compared with the phosphor located under the protective layer. The content of both nitrogen and also of the sum of the alkaline earth ions in the protective layer can be reduced by between 40 and 100%, or also between 40 and 95% compared with the phosphor located under the protective layer.

Phosphor particles comprising a protective layer that can be produced according to one of the methods described above are also the object of the invention.

As already discussed, material is removed here by an acid treatment step A) from the surface regions of the phosphor particles, so that in the subsequent tempering step B) a particularly resistant protective layer can be formed from these surface regions. X-ray photoelectron spectroscopy (XPS) measurements have shown that a protective layer that can be produced by this method can, in addition to the elements present in the intact phosphor, selected, for example, from silicon, aluminum, nitrogen, alkaline earth ions, also contain other elements, for example, oxygen, which can be introduced into the protective layer, e.g., by the treatment step A) with an aqueous acid solution in particular or also by the tempering in step B) in an atmosphere containing oxygen.

The most diverse variants of the method according to the invention can be carried out with different aluminum-containing and/or silicon-containing phosphor particles. The following phosphors are considered in particular, but not exclusively, as possible candidates for phosphors:

$(Ba_{1-x-y}Sr_xCa_y)SiO_4:Eu^{2+}$ ($0 \le x \le 1$, $0 \le y \le 1$), $(Ba_{1-x-y}Sr_xCa_y)_3SiO_5:Eu^{2+}$ ($0 \le x \le 1$, $0 \le y \le 1$), $Li_2SrSiO_4:Eu^{2+}$, $Ca_8Mg(SiO_4)_4Cl_2:Eu^{2+}$, Oxo-Nitride such as $(Ba_{1-x-y}Sr_xCa_y)Si_2O_2N_2:Eu^{2+}$ ($0 \le x \le 1$; $0 \le y \le 1$), $SrSiAl_2O_3N_2:Eu^{2+}$, $Ba_{4-x}Ca_xSi_6ON_{10}:Eu^{2+}$ ($0 \le x \le 1$), $(Ba_{1-x}Sr_x)Y_2Si_2Al_2O_2N_5:Eu^{2+}$ ($0 \le x \le 1$), $Sr_xSi_{(6-y)}Al_yO_yN_{(8-y)}:Eu^{2+}$ ($0.05 \le x \le 0.5$; $0.001 \le y \le 0.5$), $Ba_3Si_6O_{12}N_2:Eu^{2+}$, $Si_{6-z}Al_zO_zN_{8-z}:Eu^{2+}$ ($0 \le z \le 0.42$), $M_xSi_{12-m-n}Al_{m+n}O_nN_{16-n}:Eu^{2+}$ (M=Li, Mg, Ca, Y; x=m/v; v=valence of M, x≤2), $M_xSi_{12-m-n}Al_{m+n}O_nN_{16-n}:Ce^{3+}$, $AE_{2-x-a}RE_xEu_aSi_{1-y}O_{4-x-2y}N_x$ (AE=Sr, Ba, Ca, Mg; RE=rare earth metal element), $AE_{2-x-a}RE_xEu_aSi_{1-y}O_{4-x-2y}N_x$ (AE=Sr, Ba, Ca, Mg; RE=rare earth metal element) $Ba_3Si_6O_{12}N_2:Eu^{2+}$ or Nitride such as $La_3Si_6N_{11}:Ce^{3+}$, $(Ba_{1-x-y}Sr_xCa_y)_2Si_5N_8:Eu^{2+}$, $(Ca_{1-x-y}Sr_xBa_y)AlSiN_3:Eu^{2+}$ ($0 \le x \le 1$; $0 \le y \le 1$), $Sr(Sr_{1-x}Ca_x)Al_2Si_2N_6:Eu^{2+}$ ($0 \le x \le 0.2$), $Sr(Sr_{1-x}Ca_x)Al_2Si_2N_6:Ce^{3+}$ ($0 \le x \le 0.2$) $SrAlSi_4N_7:Eu^{2+}$, $(Ba_{1-x-y}Sr_xCa_y)SiN_2:Eu^{2+}$ ($0 \le x \le 1$; $0 \le y \le 1$), $Ba_{1-x-y}Sr_xCa_y)SiN_2:Ce^{3+}$ ($0 \le x \le 1$; $0 \le y \le 1$), $(Sr_{1-x}Ca_x)LiAl_3N_4:Eu^{2+}$ ($0 \le x \le 1$), $Ba_{1-x-y}Sr_xCa_y)Mg_2Al_2N_4:Eu^{2+}$ ($0 \le x \le 1$; $0 \le y \le 1$), $(Ba_{1-x-y}Sr_xCa_y)Mg_3SiN_4:Eu^{2+}$ ($0 \le x \le 1$; $0 \le y \le 1$).

According to a particularly preferred embodiment, the phosphor particles comprise a phosphor that contains an inorganic substance, which contains in its composition at least the element D, the element A1, the element AX, the element SX and the element NX (wherein D represents one, two or more elements from the group Mn, Ce, Pr, Nd, Sm, Eu, Tb, Dy, Ho, Er, Tm alkaline metals (Li, Na, K, Rb, Cs) and Yb, A1 represents one, two or more elements from the group of divalent metals, which are not included in D, SX represents one, two or more elements from the group of tetravalent metals containing Si, AX represents one, two or more elements from the group of trivalent metals and NX represents one, two or more elements from the group O, N, S, C, Cl, F) and has the same crystal structure as $Sr(Sr_aCa_{1-a})Si_2Al_2N_6$.

The inventors have established that such a phosphor has a number of advantages compared with conventional phosphors, as described further below.

In the following, a phosphor that "has the same crystal structure as $Sr(Sr_aCa_{1-a})Si_2Al_2N_6$" is defined as a phosphor, which in addition to space group $P2_1$ can also be described in one of space groups 1 to 3 according to the International Tables Crystallography A, thus in the following space groups: P1, P2, P$\bar{1}$, and the length of the chemical bonds of which between the elements Al—N and Si—N calculated from the lattice constants and atomic coordinates according to a Rietveld analysis lies within a value of ±15% of the values described in FIG. 22.

According to another embodiment of the present invention, the space group is monoclinic $P2_1$.

According to another embodiment of the present invention, the inorganic substance can be described by the following general formula:

$(D_aAl_b)(D_cAl_d)SX_eAX_fNX_g$ wherein $a+b \le 1$ and $c+d \le 1$ and wherein the parameters a, b, c, d, e, f and g satisfy the following conditions:

$0 \le a \le 0.5$; $0 \le c \le 0.5$; $0 \le b \le 1$; $0 \le d \le 1$; $a+c>0$; $b+d<2$; $0.1 \le e \le 8$; $0.1 \le f \le 16$; $0.8(f+4/3\ e+2/3(b+d)) \le g$; and $g \le 1.2(f+4/3\ e+2/3(b+d))$.

The following preferably applies:
$0 \le a \le 0.1$; $0 \le c \le 0.1$; $0 \le b \le 1$; $0 \le d \le 1$; $a+c>0$; $b+d<2$; $0.1 \le e \le 8$; $0.1 \le f \le 16$; $0.8(f+4/3\ e+2/3(b+d)) \le g$; and $g \le 1.2(f+4/3\ e+2/3(b+d))$.

According to another embodiment, the phosphor has a general molecular formula $Al(Al_aM_{1-a})SX_2AX_2NX_6:D$. Here A1 is at least a divalent metallic element, for example, Sr, M is another divalent metallic element, for example, Ca, SX contains at least one tetravalent element, such as, e.g., Si and/or C, AX contains at least one trivalent element, such as, e.g., Al and/or La and NX contains at least one element selected from the group N, O, F, Cl.

Furthermore, the general elements A1, M, SX, AX and NX in this molecular formula can have the meanings already described above, thus D represent one, two or more elements from the group Mn, Ce, Pr, Nd, Sm, Eu, Tb, Dy, Ho, Er, alkaline metals (Li, Na, K, Rb, Cs), particularly Li, Tm and Yb, A1 represent one, two or more elements from the group of divalent metals, which are not included in D, SX represent one, two or more elements from the group of tetravalent metals, e.g., Si, C, Ge, Hf, Zr, Ti, AX represent one, two or more elements from the group of trivalent metals, e.g., Al, La, Ga, In, B, and NX represent one, two or more elements from the group O, N, S, C, Cl, F.

The parameter value a can lie between 0.6 and 1.0, or between 0.8 and 1.0. It can also be the case that a<1.

The object of the present invention according to another embodiment is furthermore a phosphor of the general formula:

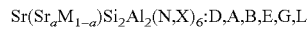
$Sr(Sr_aM_{1-a})Si_2Al_2(N,X)_6:D,A,B,E,G,L$ wherein co-doping of the novel phosphors with the elements A, B, E, G and L takes place and these co-dopants can occupy either positions in the host lattice or interstitials. The general element X denotes elements such as, e.g., O or halogen, which are used in particular also for charge carrier compensation if occupied interstitials are present in the crystal lattice or empty spaces are present at lattice sites.

In this case the metal M is selected from Ca, Ba, Mg alone or in combination, A is selected from divalent metals that are different from M and from the other dopant D used, such as, e.g., Cu, Zn or their combinations, B stands for trivalent metals, in particular transition or rare earth metals, e.g. La or Pr and E for monovalent metals, e.g., Li or other alkaline metals such as Cs, Rb, K or Na. G stands for tetravalent elements, such as, e.g., C or Ge, or Hf, Zr, Ti. The element L here denotes trivalent elements such as, e.g., B, Ga or In.

In particular, this phosphor can have the following general formula:

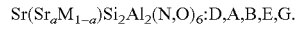
$Sr(Sr_aM_{1-a})Si_2Al_2(N,O)_6:D,A,B,E,G.$

In the following, instead of the general formula $Sr(Sr_aM_{1-a})Si_2Al_2(N,O)_6:D,A,B,E,G$, the formulae $Sr(Sr_aM_{1-a})Si_2Al_2(N,O)_6:D$ or $Sr(Sr_aM_{1-a})Si_2Al_2(N,O)_6:Eu$, $Sr(Sr_a$ $M_{1-a})Si_2Al_2(N)_6:D$ or $Sr(Sr_aM_{1-a})Si_2Al_2(N)_6:Eu$ are used synonymously for reasons of simplicity.

The dopants can furthermore assume specific positions within the crystal lattice of the novel phosphors such as, e.g., lattice sites or interstitials and even replace present elements in the phosphors, so that according to another embodiment a phosphor of the following general formula results:

$$Sr_{(1-x-h)}(Sr_aM_{1-a})_{(1-y-i)}A_{(x+y)}B_{(h+i)/2}E_{(h+i)/2}Si_{(2-z)}G_zAl_{2-v}L_v(N,X)_6:D.$$

In particular, the general formula can be constructed as follows:

$$Sr_{(1-x-h)}(Sr_aM_{1-a})_{(1-y-i)}A_{(x+y)}B_{(h+i)/2}E_{(h+i)/2}Si_{(2-z)}G_zAl_2N_6:D$$

wherein the metal M and the elements A, B and E denote the elements just described above and wherein $0 \leq x+y \leq 0.4$, preferably $0 \leq x+y \leq 0.3$, more preferably $0.04 \leq x+y \leq 0.3$ applies, x+y can be in particular 0.2 or 0.04, furthermore $0 \leq h+i \leq 0.4$, preferably $0 \leq h+i \leq 0.3$, more preferably $0.04 \leq h+i \leq 0.3$, applies, wherein no B can also be present, so that x=0 and y=0. The parameters h+i can be in particular 0.2 or 0.04, wherein no B and E can also be present, so that h=0 and i=0 applies. In this case the divalent metals A and/or a combination of identical molar proportions of the trivalent and monovalent metals B and E can replace Sr and/or Ca. The parameters x+y, h+i and z can be chosen here independently of one another. Furthermore, x and y and h and i can respectively be 0 independently of one another.

G denotes tetravalent elements such as, e.g., C or Ge, which replace Si, wherein the following applies for the parameter z: $0 \leq z \leq 1$, or $0 \leq z \leq 0.5$, or $0.02 \leq z \leq 0.3$, wherein z can be in particular 0.02 or 0.4 or no tetravalent element can be present, so that z=0. The parameter v for the element L can assume the following values: $0 \leq v \leq 1$, also $0 \leq v \leq 0.5$.

Replacement of Sr and M by A and/or replacement of Sr and M by a combination of B and E can lead to a change in the color location in the CIE color space, to a change in the dominant wavelength, reflectivity, luminous efficacy Vs, thermal quenching behavior, stability against radiation, sensitivity to hydrolysis and/or the FWHM of the novel phosphor and thus open up further possibilities for adapting the inventive phosphors for specific applications.

Replacement of Si by G can also lead to a strong shift in the wavelength of the emission of the phosphor and can thus achieve an improvement in the color rendering index, especially in the color rendering of dark red colors. Co-doping with, e.g., carbon thus increases the opportunities for reaching certain color locations.

Furthermore, it is possible that the tetravalent element G, e.g., C also replaces the N-atoms to some extent in novel phosphors, wherein G is then present as $G^{4-}$, so that the following general structural formulae result:

$$Sr(Sr_aM_{1-a})Si_2G_{3z}Al_2(N,X)_{6-4z}:D \text{ and}$$

$$Sr(Sr_aM_{1-a})Si_2G_{3z}Al_2N_{6-4z}:D.$$

In another embodiment of the phosphor, x+y, h+i and/or z can respectively =0, wherein the following general formulae then result:

$$Sr(Sr_aM_{1-a})Si_{(2-z)}G_zAl_2(N,X)_6:D \text{ or}$$

$$Sr(Sr_aM_{1-a})Si_{(2-z)}G_zAl_2N_6:D.$$

For x+y=0 (x=0 and y=0) and additionally h+i=0 (h=0 and i=0) or the general formula:

$$Sr_{(1-h)}(Sr_aM_{1-a})_{(1-i)}B_{(h+i)/2}E_{(h+i)/2}Si_2Al_2(N,X)_6:D \text{ or}$$

$$Sr_{(1-h)}(Sr_aM_{1-a})_{(1-i)}B_{(h+i)/2}E_{(h+i)/2}Si_2Al_2N_6:D$$

results if z=0 and x+y=0 (x=0 and y=0).

Furthermore, exclusively divalent metals A can replace Sr and M, thus no B or E or G can be present, so that the following general formulae result:

$$Sr_{(1-x)}(Sr_aM_{1-a})_{(1-y)}A_{(x+y)}Si_2Al_2(N,X)_6:D \text{ or}$$

$$Sr_{(1-x)}(Sr_aM_{1-a})_{(1-y)}A_{(x+y)}Si_2Al_2N_6:D.$$

Furthermore, M in the above formulae can preferably be Ca.

Another embodiment of a phosphor according to the invention has the following general formula:

$$Sr_{(1-x)}(Sr_aM_{1-a})_{(1-y)}B_{(x+y)}Si_{2-(x+y)}Al_{2+(x+y)}N_6:D \text{ or}$$

$$Sr_{(1-x)}(Sr_aM_{1-a})_{(1-y)}B_{(x+y)}Si_{2-(x+y)}Al_{2+(x+y)}N_6:D$$

so that Sr and M, as well as Si are replaced by a combination of the trivalent metals B and Al, wherein the following applies here too: $0 \leq x+y \leq 0.4$, preferably $0.04 \leq x+y \leq 0.3$, x+y can be in particular 0.2.

All aforementioned phosphors have a strong absorption in the blue spectral range and emit red secondary radiation. Furthermore, these phosphors have the same crystal structure as $Sr(Sr_aCa_{1-a})Si_2Al_2N_6$, thus crystallize in the space groups P1, P2, P$\bar{1}$, in particular in the monoclinic space group P2$_1$.

Phosphors of the general formulae already described above are also the object of another embodiment of the present invention:

$$Sr_{(1-x-h)}(Sr_aM_{1-a})_{(1-y-i)}A_{(x+y)}B_{(h+i)/2}E_{(h+i)/2}Si_{(2-z)}G_zAl_2N_6:D$$

or $$Sr_{(1-x)}(Sr_aM_{1-a})_{(1-y)}B_{(x+y)}Si_{2-(x+y)}Al_{2+(x+y)}N_6:D$$

wherein D represents one, two or more elements from the group Mn, Ce, Pr, Nd, Sm, Eu, Tb, Dy, Ho, Er, Tm, alkaline metals, thus Li, Na, K, Rb, Cs, preferably Li and Yb. D is preferably chosen from Eu, Ce, Li, Mn and combinations of these. The activator D is preferably selected from at least one element from Eu, Ce, Mn, in particular Eu, Ce or Mn or a mixture of Eu, Ce, Li. By using the last-named activators the color location of the phosphor in the CIE color space, its dominant wavelength λdom, the luminous efficacy Vs, FWHM and the diffuse reflectivity (remission) can be set particularly well at 450-470 nm.

Furthermore, co-doping in particular of phosphors according to the invention doped with Eu is possible with alkaline metals, thus Li, Na, K, Rb, Cs, preferably Li. The co-doping with the alkaline metals can lead in particular to a reduction in the spectral full width at half maximum FWHM as well as improved behavior with regard to thermal quenching, and bring about an improvement in the luminous efficacy.

According to another embodiment of the present invention, the activator D is a combination of Eu and one or more alkaline metals, preferably Li. This can result in a further reduction in the FWHM of the emitted radiation, and an improvement in the thermal quenching behavior and quantum efficiency.

A general formula of this phosphor with a combination of Eu and Li can be described as follows:

$$Sr_{(1-x-h)}(Sr_aM_{1-a})_{(1-y-i)}A_{(x+y)}B_{(h+i)/2}E_{(h+i)/2}Si_{(2-z)}G_zAl_2N_6:Eu,Li \text{ or}$$

$$Sr_{(1-x)}(Sr_aM_{1-a})_{(1-y)}B_{(x+y)}Si_{2-(x+y)}Al_{2+(x+y)}N_6:Eu,Li.$$

It is possible here that the lithium metal ions occupy positions in the host lattice and/or are present on interstitials.

Charge carrier compensation can take place by adaptation of the Si:Al ratio and/or by replacement of the partial N by O and/or halogens such as F. Statistically distributed gaps within the cation lattice sites are also possible. For this reason the following general formulae are also suitable to describe novel phosphors with Eu and Li as activators, wherein for reasons of clarity the additional elements A, B, E and G are not shown, but can be present in principle:

$$Li_jSr(Sr_aM_{1-a})Si_{(2-j)}Al_{(2+j)}N_6:Eu$$

$$Sr(Sr_aM_{1-a})Li_jSi_{(2-j)}Al_{(2+j)}N_6:Eu$$

$$Li_{2j+2k+2l}Sr_{1-j}(Sr_{a-k}M_{1-a-l})Si_2Al_2N_6:Eu$$

$$Li_jSr_{1-k}(Sr_aM_{1-a})_{1-l}Si_{2+m}Al_{2-n}N_6:Eu$$

$$Li_j[Sr(Sr_aM_{1-a})]_{1-j}Si_{2+j}Al_{2-j}N_6:Eu.$$

Here the following applies to the parameter j: $0 \leq j \leq 0.2$, preferably $0 \leq j \leq 0.15$, more preferably $0 \leq j \leq 0.05$.

According to another embodiment, the phosphor has a general molecular formula $Sr(Sr_aM_{1-a})Si_2Al_2N_6:D$. Here M is Ca and/or Ba. M can also be selected from the group Ca, Ba, Zn, Mg and/or Li alone or in combination. In these cases and the general formulae described above, the value of a can lie at 0.6 to 1.0, preferably at 0.8 to 1.0 (boundary values excluded). In particular, a is selected at 0.7 to 0.99, more preferably at 0.85 to 0.99, boundary values included.

According to another embodiment of the invention, the activator D can be present here in mol % amounts between 0.1% and 20 mol %, or 0.1% and 10%, or 1 mol %-10 mol %, or 0.5% to 5%, 2-5 mol %, or 0.8% to 3%. Here and below, % indications for the activator, in particular Eu, are understood as mol % indications related to the mole contents of the alkaline earth metals in the respective phosphor.

The activator D can preferably be selected from the metals Eu, Ce, Mn and Li as well as combinations of these. Furthermore, the activator D can be Eu, Mn or Ce as well as combinations of Eu, Ce and Li.

As the concentration of europium dopant increases, the dominant wavelength of the emission of the novel phosphors shifts towards higher wavelengths from the orange to the red colour range (see FIG. 11a), wherein the relative intensity of the photoluminescence rises from 0.1-roughly 4 mol % and then falls again as activator concentrations of europium rise further (see FIG. 11b). With regard to the relative intensity of the photoluminescence, a concentration range of 1-10 mol % Eu or of 2-5 mol % is preferable. The relative intensity of the photoluminescence as evaluated with the eye also behaves largely analogously to the relative intensity of the photoluminescence, likewise increasing with rising activator concentrations of europium and falling again from roughly 4 mol % to roughly 20 mol % (see FIG. 11c). With regard to the visually assessed photoluminescence intensity, activator concentrations of 0.4-10 mol % Eu, or 1-5 mol % europium are preferable.

According to at least one embodiment, the phosphor is set up for the emission of red or orange light. Red or orange light means that the phosphor emits radiation with a dominant wavelength of at least 560 nm, preferably between inclusively 585 nm and 640 nm, in particular between inclusively 590 nm and 615 nm.

The dominant wavelength is in particular the wavelength that results as the point of intersection of the spectral color line of the CIE chromaticity diagram with a straight line, wherein this straight line, starting out from the white point in the CIE chromaticity diagram, runs through the actual color location of the radiation. The dominant wavelength generally deviates from a wavelength of maximum intensity. In particular, the dominant wavelength lies in the red spectral range at smaller wavelengths than the wavelength of maximum intensity.

According to at least one embodiment, the phosphor has a general molecular formula $Sr(Sr_aCa_{1-a})Si_2Al_2N_6:D$. Here D is at least one activation element. D is frequently formed by element Eu and/or also Ce. Other or additional activation elements or dopings can be selected from the group Mn, Ce, Pr, Nd, Sm, Eu, Gd, Tb, Dy, Ho, Er, Tm, Yb, and Lu respectively alone or in combination. It is possible that the phosphor has other elements, for instance in the form of impurities, wherein these impurities, taken together, should preferably have at most a weight proportion of the phosphor of 0.1 per mil at most, or 100 ppm or 10 ppm, parts per million.

The synthesis and other properties of the novel red phosphor are described in the pending PCT application PCT/EP 2014/071544, to which reference is made hereby in full.

In at least one embodiment, the method comprises at least the following steps, preferably in the order indicated:

A) Provision of educts present as solid bodies for Sr, Al, Si and Eu as well as optionally for Ca, B) Mixing of the educts, C) Heating of the educts in an inert gas atmosphere, in particular a nitrogen atmosphere or in a forming gas atmosphere to at least 1.500° C. and formation of an annealing cake, and D) Crushing of the annealing cake to produce the phosphor.

According to at least one embodiment of the method, at least step C) or even all steps take place at roughly atmospheric pressure. In particular, the method is not implemented under high pressure conditions. The atmospheric pressure and/or an overall pressure is between 0.9 bar and 1.5 bar inclusively or 0.95 bar and 1.05 bar.

As educt and as a source of strontium, aluminum and/or calcium, the respective pure metals or also metal alloys with the corresponding metals can be used. Likewise, silicides, hydrides, nitrides, oxinitrides, halogenides and/or oxides of these metals can be used as educts. Furthermore, mixtures of these compounds can be used.

As educt or source for silicon for the production of the phosphor, a silicon metal compound, a silicon nitride, an alkaline earth silicide, silicon diimide or a mixture of these compounds can be used. Silicon nitrides and/or silicon metals are preferably used.

As educt or source for Eu, metallic europium, a europium alloy, a europium oxide, a europium nitride, europium hydride or a europium halogenide can be used. Mixtures of these compounds can also be used. Europium oxide is preferably used as an educt for europium.

As educts for the other tetravalent elements G, e.g., C, the trivalent elements B, e.g., La, the monovalent elements E, e.g., Li and the divalent elements A other than D and M, e.g., Cu or Zn, it is possible to use the corresponding elements, for example, silicides, hydrides, nitrides, oxinitrides, carbonates, hydroxides, halogenides and/or oxides of these elements and compounds derived from these, such as, e.g., hydrates. For example, $Mn_2O_3$, CuO, $Zn_3N_2$, $La_2O_3$, $Li_2B_4O_7$ and graphite can be used.

According to at least one embodiment, a flux and/or a fluxing agent are used to improve the crystallinity and/or to support the crystal growth. Chlorides, fluorides, halogenides and/or boron-containing compounds of the alkaline earth metals used are preferably used for this. Even combinations of two or more fluxes or fluxing agents can be used. In particular, e.g., at least one of the following substances is used as a flux and/or fluxing agent: LiF, LiCl, NaF, NaCl, $SrCl_2$, $SrF_2$, $CaCl_2$, $CaF_2$, $BaCl_2$, $BaF_2$, $NH_4Cl$, $NH_4F$, KF, KCl, $MgF_2$, $MgCl_2$, $AlF_3$, $H_3BO_3$, $B_2O_3$, $Li_2B_4O_7$, $NaBO_2$, $Na_2B_4O_7$, $LiBF_4$. $NH_4HF_2$, $NaBF_4$, $KBF_4$, $EuF_3$ and compounds derived from these such as, e.g., hydrates are also suitable.

According to at least one embodiment, the starting substances are weighed in, in particular for Sr, Ca, Al and/or Si as well as Eu and if applicable also for the other tetravalent elements G, e.g., C, the trivalent elements B, e.g., La, the monovalent elements E, e.g., Li and the divalent elements A other than D and M, e.g., Cu or Zn, according to the general molecular formula of the phosphor. It is possible for the alkaline earth components Sr, Ca also to be weighed in with an excess to compensate for any evaporation losses occurring during the synthesis. The use of Ba as an alkaline earth component is also possible.

According to at least one embodiment, a step E) follows step D). In step E) further annealing of the phosphor takes place, which can also be described as tempering. The annealing takes place in particular at a temperature of at least 1500° C. and preferably in a nitrogen atmosphere or forming gas atmosphere. Forming gas describes a mixture of $N_2$ and $H_2$. The temperature of at least 1500° C. in the steps C) and/or E) is present for at least four hours or six hours. For example, a temperature of 1650° C.±50° C. is present in the steps C) and E) respectively.

According to an alternative embodiment of a method according to the invention for the production of such a phosphor, the steps C) and D) can also be repeated instead of step E).

According to at least one embodiment, mixing of the educts takes place in a ball mill or a tumble mixer. It can be advantageous in the mixing process to select the conditions such that a lot of energy is introduced into the mixed material, due to which pulverization of the educts takes place. The thus increased homogeneity and reactivity of the mixture can have a positive influence on the properties of the resulting phosphor.

The occurrence of subsidiary phases can be reduced by targeted variation of the bulk density or by modification of the agglomeration of the educt mixture. A particle size distribution, particle morphology and/or yield of the resulting phosphor can also be influenced. Techniques especially suitable for this are screening and granulation, also with the use of suitable additives.

According to at least one embodiment, tempering takes place, in particular in a crucible of tungsten, molybdenum or boron nitride. The tempering takes place preferably in a gas-tight furnace in a nitrogen atmosphere or in a nitrogen/hydrogen atmosphere. The atmosphere can flow or be stationary. Carbon can also be present in the furnace space in a finely distributed form. Multiple temperings of the phosphor are also possible to improve the crystallinity or the grain size distribution or influence them targetedly. Other advantages can be a lower defect density, combined with improved optical properties of the phosphor and/or a higher stability of the phosphor. Between the temperings the phosphor can be treated in a variety of ways or substances such as fluxes can be added to the phosphor.

For grinding of the phosphor, a mortar mill, a fluidized bed mill or a ball mill can be used, for instance. Attention should preferably be paid during grinding to keeping the proportion of splintered grain produced to a minimum, as this can impair the optical properties of the phosphor.

The phosphor can be washed in addition. To do this, the phosphor can be washed in water or aqueous acids such as hydrochloric acid, nitric acid, hydrofluoric acid, sulphuric acid, organic acids or a mixture of these. Alternatively or in addition, the phosphor can be washed in a lye such as caustic soda lye, potash lye, an aqueous ammonia solution or mixtures of these. Alternatively or in addition, washing in organic solvents such as acetone, propyl alcohol and/or phenol is possible. The washing preferably takes place after the grinding.

According to at least one embodiment, the tempering, further annealing, grinding, screening and/or washing achieves removal of subsidiary phases, glass phases or other contamination and thus an improvement in the optical properties of the phosphor.

One exemplary embodiment of a phosphor described here can be produced as follows:

As educts for the synthesis of the phosphor of the general molecular formula $Sr(Sr_aCa_{1-a})Si_2Al_2N_6$:Eu the binary nitrides of the constituting elements are used, thus $Ca_3N_2$, $Sr_3N_2$, AlN and $Si_3N_4$. Since these are substances that are highly sensitive to oxidation and hydrolysis, work is carried out in a so-called glove box in an $N_2$ atmosphere with $O_2$<1 ppm and $H_2O$<1 ppm. In addition, $Eu_2O_3$ is used for doping with $Eu^{2+}$. Weighing in takes place in such a way that quasi in a simplified representation the following atomic ratio is present:

Sr:Ca:Si:Al:Eu=(1+a):(1−a):2:2:y, where y corresponds to the degree of doping, thus to the proportion of divalent lattice sites that are substituted by Eu. In addition, various fluxes are added, see the explanation above. An educt mixture is scaled, retaining the atomic ratios described above, to a total weigh-in sample of 50-100 g, for example. It is also possible to use other total weigh-in samples.

The educt mixture is put together with $ZrO_2$ balls into a PET mixing container, for example, and mixed for 6 h on a roller bench in the glove box. The balls are then removed from the mixture and the powder is transferred to a closed molybdenum crucible. This crucible is placed in a tungsten outer crucible, a semi-circular open tube of tungsten, and transferred to a tube furnace. Forming gas with 92.5% $N_2$ and 7.5% $H_2$ flows through the tube furnace at 3 l/min during the operating time. In the tube furnace, the mixture is heated at a rate of 250 K/h to 1650° C., maintained at this temperature for 4 h and then cooled at 250 K/h to 50° C. The resulting annealing cake is removed from the furnace when cold, crushed in a mortar mill and screened by a screen with a mesh size of 31 μm. The screening fraction ≤31 μm is the phosphor used.

The screening can be followed optionally by further annealing, tempering and/or washing and/or a coating process.

Examples of weigh-in samples m in g and resulting color locations CIE x, CIE y, also termed color locus or "chromaticity coordinate", of the emission spectrum of the respective phosphor in the CIE chromaticity diagram on excitation with blue light at 460 nm and with complete absorption of the blue light are listed in the table in FIGS. 12a/1 to 12a/3 and FIGS. 12b/1 to 12b/4. Weigh-in samples with x≤0.8 describe conventional $CaAlSiN_3$ phosphors here, while weigh-in samples with x>0.8 (corresponds to a>0.6) identify the novel phosphors.

BRIEF DESCRIPTION OF THE DRAWINGS

Embodiments of the present invention are to be explained in greater detail below with reference to specific examples and figures.

These show:

FIG. 3 is the relative absorption of phosphor particles with protective layers in the context of a stability test in regard to the pH value during the acid treatment step A), FIG. 4 is the stability of different phosphors, which were treated by the method according to the invention and subjected to different temperatures in step B) as relative absorption at 440 to 460 nm as a function of the duration of a stability test, FIG. 7 is the chemical composition determined by X-ray photoelectron spectroscopy (XPS) of a phosphor particle provided with a protective layer by a method according to the invention compared with a phosphor particle without a protective layer, FIG. 10 shows the relative absorption of plotted phosphor particles with different inventive protective layers and of uncoated particles following a stability test, FIGS. 11a to 11c show the effects of different Eu doping concentrations on the dominant wavelength, the relative intensity of the photoluminescence and the relative photoluminescence intensity assessed with the eye for a novel phosphor, which can be provided with the protective layer according to the invention, and FIGS. 12a/1 to 12a/3 and FIGS. 12b/1 to 12b/4 show weigh-in samples m in grams for various educts for the production of novel phosphors preferably to be coated with a protective layer.

DETAILED DESCRIPTION OF ILLUSTRATIVE EMBODIMENTS

Figure 1:
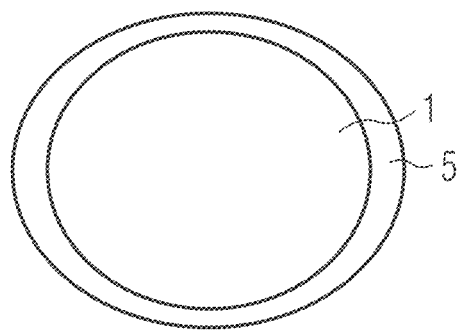
FIG. 1 is a schematic drawing of a phosphor particle with a protective layer.

FIG. 1 shows schematically a phosphor particle 1 with a protective layer 5 produced by a method according to the invention, which layer can be produced in particular by an acid treatment step A) with subsequent tempering step B) from surface regions of the phosphor particle and/or subsidiary phases additionally contained in the phosphor. The protective layer 5 is preferably present here continuously on all surface regions of the phosphor particle 1, so that particularly good protection results in relation to environmental influences such as humidity.

All the experimental data shown below in FIGS. 2 to 11 relate to novel red or orange emitting phosphors of the general formula $Sr(Sr_aM_{1-a})Si_2Al_2N_6:D$, wherein M is selected from the group Ca, Ba, Zn, Mg and D is selected from Eu and Ce.

Figure 2:
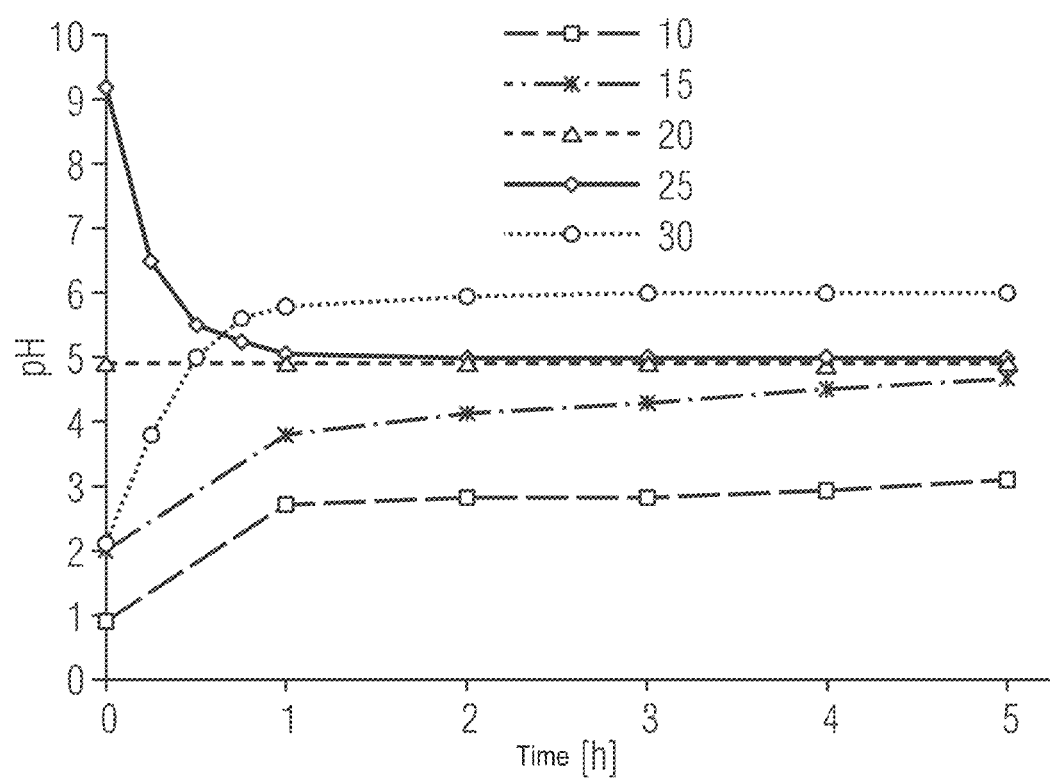
FIG. 2 is a graphic development of the pH values during different inventive and traditional methods for producing a protective layer as a function of the reaction time.

FIG. 2 shows the curve of the pH value of suspensions of red emitting phosphors of the general formula $Sr(Sr_aM_{1-a})Si_2Al_2N_6:D$ with M selected from calcium, barium, zinc, magnesium and D selected from Eu and Ce as a function of the period of the acid treatment and the manner of acid addition in method step A).

The curve provided with the reference sign 10 shows the pH curve of a conventional method for the production of a protective layer, in which a large excess of acid is added and accordingly over a longer period of at least four hours the pH value is below pH 3.

The curve provided with the reference sign 15 shows the curve of the pH value in a variant of a method according to the invention, in which a predetermined quantity of acid solution is added for pH control as a function of the phosphor. It is clearly recognizable from this curve that, following the initial addition, the suspension from the acid solution and the phosphor particles is very acidic, but the pH value rises slowly from an initial value of pH 2 with incipient hydrolysis of the surface of the phosphor particles to around pH 3.7 and then varies after this for roughly four hours in a range between pH 3.7 and pH 4.2.

The curve provided with the reference sign 20 shows the pH curve in another variant of a method according to the invention, in which a buffer solution is used. Due to the buffer solution, the pH varies during the overall course of the acid treatment for over five hours below a pH value of just under 5.

The curves provided with the reference signs 25 and 30 show the pH curve in other embodiments of a method according to the invention, in which an acid solution is added as a function of the measured pH value of the acid solution. In the case of the curve provided with the reference sign 30, a starting volume of acid is added; as much acid is added by progressive dosing so as not to exceed a defined pH value upper limit (here pH=6). In the curve provided with the reference sign 25, following suspension of the phosphor without the addition of acid, the hydrolysis of the phosphor leads initially to (slightly) alkaline conditions and only after the dosed addition of acid the pH value is adjusted to a value around 5.

FIG. 3 shows a correlation between the pH value in the acid treatment step A) compared with the hydrolysis stability of the phosphor particles with the protective layer resulting from the method. The stability is assessed here and also in the experimental data of the following figures by means of an accelerated degradation test ("PCT" Pressure Cooker Test), in which phosphor particles are held in a silicon matrix at 100% relative air humidity and a temperature of 121° C. The stability of the particles is then determined with reference to the decrease in the relative absorption values of the phosphors compared with an absorption value that was measured before the degradation test was started. The degradation test is carried out in this case for 1100 hours.

The pH value measured during a 5-hour acid treatment step A) is plotted on the x-axis, while the relative absorption of the phosphor particles after the PCT test is plotted on the y-axis.

It is clearly recognizable that phosphor particles that were treated for five hours at pH values between 4 and 5.5 have a very good stability, wherein at a pH value of between 5 and 6, roughly at 5.5, the stability is at its greatest. The measuring points marked by a circle here show phosphor particles that were exposed for five hours to a very low pH of under 3.5 and were thus treated using conventional methods to produce a protective layer in which an excess of acid was used. These phosphor particles have a reduced stability compared with the phosphors treated between pH values of 4 and 6. It is likewise recognizable that at higher pH values, which lie in the neutral or slightly basic milieu, a dramatic reduction in stability can be observed.

A decrease in the relative absorption is to be attributed here to hydrolysis of the phosphor particles during the degradation test and thus to a reduced stability. In the preferred pH range of roughly 4 to 6.5, more preferably 4.5 to 6, controlled hydrolysis takes place on the surface of the phosphor particles, wherein slightly soluble hydroxides of the alkaline earth metals Sr, Ba and Ca are formed in particular, which dissolve quickly in the acid solution, while the hydroxides of Si and Al are relatively stable at this pH value. A selective elimination of the elements, in particular of the alkaline earth metals is accordingly achieved on the surface of the phosphor particles. At higher and at lower pH values compared with the preferred pH range, the solubility of the hydroxides of silicon and aluminum increases, with the result that no protective layer or only an inadequate protective layer is formed.

FIG. 4 shows the relationship between the relative absorption of phosphors, which were exposed to different temperatures in tempering step B), and the period of time for which the respective phosphors were subjected to the PCT test. All five samples shown were subjected to a comparable acid treatment step A), washed and dried. In step B) the samples were then subjected to the different tempering temperatures described in the illustration.

Here the relative absorption between 440 and 460 nm of the phosphor particles with the protective layers is plotted on the y-axis. It is clearly recognizable that the phosphors with protective layers produced in a tempering step B) at temperatures between 300 and 350° C. are the most stable, as their relative absorption scarcely decreases over a period of 300 hours in the PCT test. In contrast to these, phosphors with protective layers formed at a temperature of 200° C. or 250° C. are substantially less stable, as their relative absorption over a period of 300 hours decreases substantially more sharply. The curve referring to a tempering temperature of 450° C. also shows that at this tempering temperature the stability of the phosphor particles again decreases somewhat, as the temperature is already too high.

These data clearly show that below a tempering temperature of 300° C. and above 350° C. the phosphor particles continue to be sensitive to hydrolysis. During the tempering step B) the hydroxides of silicon and aluminum formed in particular in method step A), the hydrolysis, can be cross-linked by the elimination of water.

Figure 5:
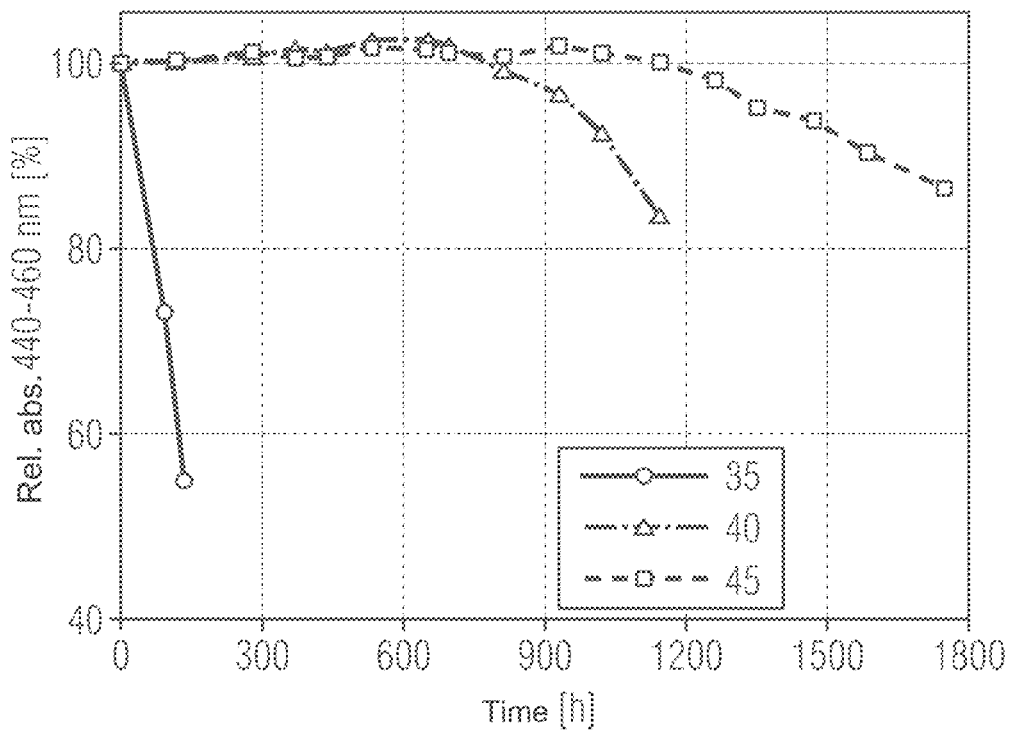
FIG. 5 is the relative absorption and thus the stability of different phosphors provided with protective layers as a function of the duration of a stability test.

FIG. 5 shows different stabilities for phosphors with and without a protective layer determined with reference to the relative absorption as a function of the period of time for which the phosphors were exposed to the PCT test. The duration of the PCT test is plotted on the x-axis and the relative absorption between 440 and 460 nm for the various phosphors is plotted on the y-axis.

The curve with the reference sign 35 shows the progression of the relative absorption for a phosphor without a protective layer, wherein very little stability of the phosphor is to be observed on account of the quickly decreasing relative absorption. The curve with the reference sign 40 here shows a phosphor with a protective layer, which was produced according to a conventional method with an excess of acid, while the curve with the reference sign 45 shows a phosphor for which the protective layer was produced by a method according to the invention, wherein an adjusted quantity of acid was added as a function of the pH value.

Again it is clearly recognizable that a phosphor with a protective layer produced by a method according to the invention exhibits increased stability even in comparison with phosphors with other traditional protective layers.

Figure 6:
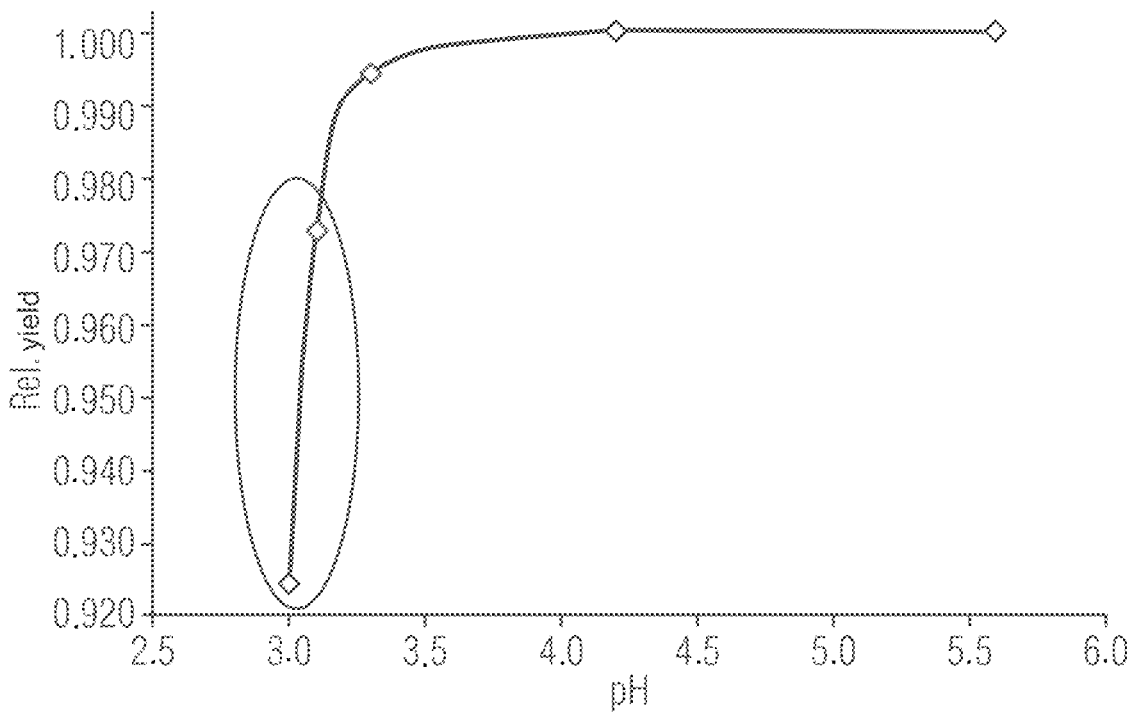
FIG. 6 is the relative yield of phosphor with protective layer as a function of the pH value during the acid treatment step A)

FIG. 6 shows the relative yield of different methods for the production of protective layers on phosphor particles as a function of the pH values during the acid treatment step. Here the pH value during an acid treatment step is plotted on the x-axis, wherein the acid treatment was carried out for five hours. It is clearly recognizable that in acid treatment steps with pH values between 3.5 and 5.5, thus methods according to the invention, very good relative yields are achieved, while in methods in which an excess of acid is present (marked by the ellipse), a reduced relative yield results.

FIG. 7 shows the chemical composition determined by X-ray photoelectron spectroscopy (XPS/Auger) of the surfaces of phosphor particles that either have a protective layer or are uncoated. Sample A does not have any protective layer and was only measured as a reference. In contrast to this, sample B was provided with a protective layer by a method according to the invention. It is clearly recognizable that the amounts (in atomic percent) of silicon on the surface of the coated phosphor particles increase markedly, while the proportions of aluminum only recede slightly. In contrast to this, the alkaline earth proportions of the three ions calcium, strontium and barium decrease significantly with the production of a protective layer on the surface of the phosphor particles. The decrease in the amount of nitrogen on the surface of the phosphor particles is likewise clear. Furthermore, the sums for the alkaline earth elements ($\Sigma$ AE) as well as the sum of the elements aluminum and silicon ($\Sigma$ AE, $\Sigma$ Al+Si) and the quotients formed from these were listed in the table. Carbon and oxygen were also determined on the surfaces of the phosphor particles by the XPS spectroscopy, wherein carbon and oxygen can be adsorbed and/or absorbed from the air.

Figure 8:
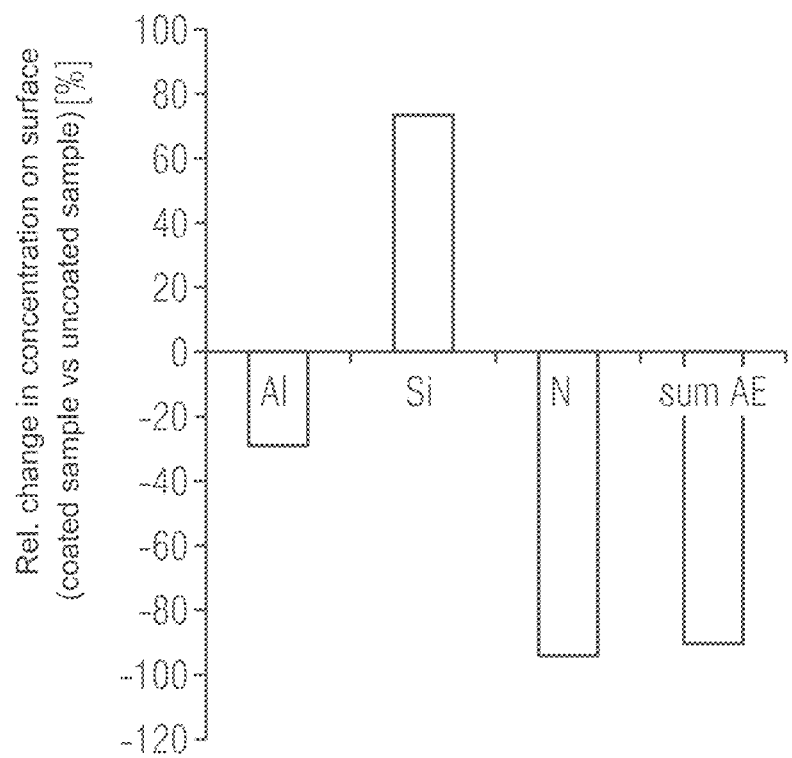
FIG. 8 shows a graphical representation of the change in the relative concentrations of the elements aluminum, silicon, nitrogen and the total of all alkaline earth elements for a surface-treated phosphor particle according to the present invention compared with an uncoated phosphor.

FIG. 8 shows a comparison of the changes in the relative concentrations of aluminum, silicon, nitrogen and the sum of the alkaline earth elements calcium, barium and strontium (sum AE) in the phosphor particles in a comparison of a coated sample with an uncoated sample. It is clearly recognizable that the concentration of aluminum in the coated sample shows only a small decrease of at least 10% to roughly 30%, while the concentration of silicon on the surface increases sharply by at least 40 to roughly 70%. At the same time, both the concentrations of nitrogen and of the alkaline earth metal ions decrease significantly in the range of at least 60 to roughly 90% to 95%, or 60% to 100%. These data clearly prove that by means of the acid treatment step A) and subsequent tempering B) a protective layer is formed that is depleted in alkaline earth ions and nitrogen and enriched in silicon, while aluminum only decreases slightly.

Figure 9:
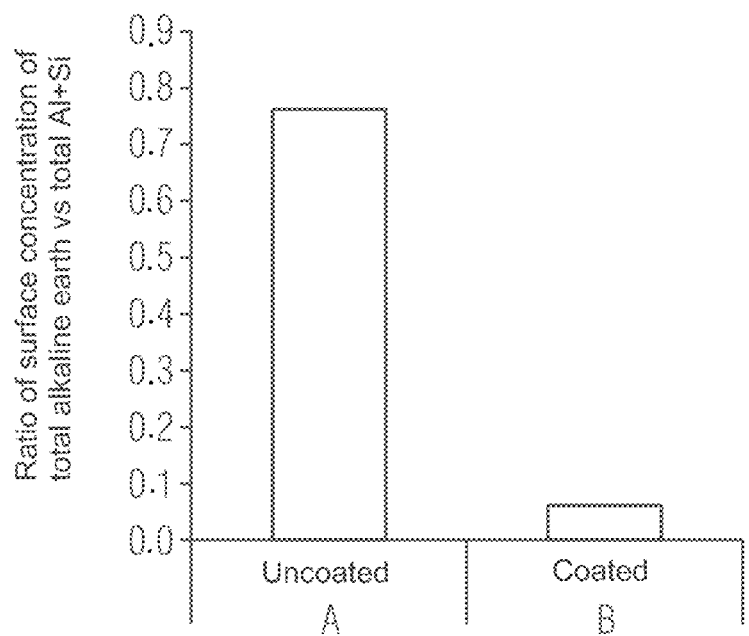
FIG. 9 shows the ratio of the surface concentrations of the totality of the alkaline earth ions (Ca, Sr, Ba) compared with the total number of aluminum and silicon ions for an uncoated and coated sample of a phosphor according to the invention.

FIG. 9 shows the enrichment of silicon and the depletion of alkaline earth ions measured as a ratio of the sum of the surface concentration of the shares of all the alkaline earth ions and the sum of the concentrations of aluminum and silicon. It is clearly recognizable that for an uncoated sample A the ratio is substantially higher than for a sample B coated by a method according to the invention, as the alkaline earth ions are removed largely by the acid treatment step from the surface regions of the phosphor particles.

Further different variants of methods according to the invention for producing phosphor particles with protective layers are described below. The average particle diameter of the stabilized phosphor of the different exemplary embodiments is respectively approx. 10-16 μm, wherein the mesh size of the screen used was 31 μm:

Exemplary Embodiment 1

20 grams of a phosphor of the general formula $Sr(Sr_aCa_{1-a})Si_2Al_2N_6$:Eu with a=0.86 and a europium share of 3% (phase purity≥95%) were put into 200 ml of deionized water and stirred constantly. 6 ml of dilute hydrochloric acid (c=2 mol/l) was added to the dispersion and the mixture was heated to a temperature of 75 to 85° C. The mixture was maintained in this temperature range and stirred constantly for five hours. The pH value was observed constantly and maintained at values of less than 5 by connecting a metering pump to a pH meter. In total 0.8 ml of dilute hydrochloric acid was added. The phosphor particles leached out by the acid were then filtered and extracted by suction and washed intensively, first with water and then with ethanol. The phosphor particles were then dried for two hours at 60° C. and then screened. The dry phosphor particles were then tempered at 350° C. for five hours. The resulting phosphor particles were designated "SP-1".

Exemplary Embodiment 2

20 g of a fluorescent powder with the composition $Sr(Sr_aCa_{1-a})Si_2Al_2N_6$:Eu with a=0.86 and a europium share of 3% (phase purity≥95%) were added to 150 ml of a buffer solution (consisting of equimolar proportions of acetic acid and sodium acetate) and stirred constantly. The mixture was heated to a temperature of 75 to 85° C. The mixture was maintained in this temperature range for 5 h, while it was stirred constantly. The pH value was determined hourly by means of a pH value indicator paper. During this time the pH value remained constant at values between 4 and 5. The acid-treated phosphor was then filtered and extracted by suction and washed extensively, first with water and lastly with ethanol. The fluorescent powder was dried for 2 h at 60° C. and then screened. The dried phosphor was then tempered at 350° C. for 5 h. The resulting stabilized phosphor was designated "SP-2".

Exemplary Embodiment 3

20 g of a fluorescent powder with the composition $Sr(Sr_aCa_{1-a})Si_2Al_2N_6$:Eu with a=0.86 and a europium share of 3% (phase purity≥95%) were put in 200 ml of deionized water and stirred constantly. 10 ml of dilute hydrochloric acid (c=2 mol/l) was added to the dispersion and the mixture was heated to a temperature between 75 and 85° C. The phosphor was leached out at this temperature while being stirred constantly for 5 h. The pH value was determined hourly during the process using a pH value measuring probe. During this time the pH value was initially at 2.6 (measured after addition of the acid) and then increased to 7.3. The leached-out phosphor was then filtered by suction and washed intensively, first with water and lastly with ethanol. The fluorescent powder was dried for 2 h at 60° C. and then screened. Finally, the dried phosphor was tempered at 350° C. for 5 h. The resulting stabilized phosphor was designated "SP-3".

Exemplary Embodiment 4

20 g of a fluorescent powder with the composition $Sr(Sr_aCa_{1-a})Si_2Al_2N_6$:Eu with a=0.86 and a europium share of 3% (phase purity≥95%) were put into 200 ml of deionized water and stirred constantly. 25 ml of dilute hydrochloric acid (c=2 mol/l) was added to the dispersion and the mixture was heated to a temperature of 75 to 85° C. The mixture was then maintained in this temperature range while being stirred constantly for 5 h. The pH value was determined hourly during the process using a pH value measuring probe. During this time the pH value was initially at 1.1 (measured following addition of the acid) and then increased to 3.1. The leached-out fluorescent powder was then filtered by suction and washed intensively, first with water and then with ethanol. The fluorescent powder was then dried for 2 h at 60° C. and then screened. The dry fluorescent powder was then tempered at 350° C. for 5 h and the resulting stabilized fluorescent powder was designated "SP-4".

Exemplary Embodiment 5

20 g of a fluorescent powder with the composition $Sr(Sr_aCa_{1-a})Si_2Al_2N_6$:Eu with a=0.86 and a europium share of 3% (phase purity≥95%) were put into 200 ml of deionized water and stirred constantly. 15 ml of dilute hydrochloric acid (c=2 mol/l) was added to the dispersion and the mixture was heated to a temperature of 75 to 85° C. The mixture was maintained in this temperature range with constant stirring for 2 h. The pH value was determined at the start and end of the process using a pH value measuring probe. During this time the pH value was 1.6 initially (measured following addition of the acid) and then increased to a pH value of 4.5. The leached-out phosphor was then filtered by suction and washed intensively, first with water and lastly with ethanol. The fluorescent powder was then dried for 2 h at 60° C. and screened. Finally, the dried fluorescent powder was tempered at 350° C. for 5 h and the resulting stabilized phosphor designated "SP-5".

Exemplary Embodiment 6

20 g of a fluorescent powder with the composition $Sr(Sr_aCa_{1-a})Si_2Al_2N_6$:Eu with a=0.86 and a europium share of 3% (phase purity≥95%) were put into 200 ml of deionized water and stirred constantly. 25 ml of dilute hydrochloric acid (c=2 mol/l) was added to the dispersion and the mixture was heated to a temperature of 75 to 85° C. The mixture was maintained in this temperature range with constant stirring for 8 h. The pH value was determined at the start and end of the process using a pH value measuring probe. After this time the pH value of the mixture was 3. The leached-out fluorescent powder was then filtered by suction and washed intensively, first with water and lastly with ethanol. The fluorescent powder was then dried for 2 h at 60° C. and then screened. The dried fluorescent powder was then tempered at 350° C. for 5 h. The resulting stabilized phosphor was designated "SP-6".

Exemplary Embodiment 7

20 g of a fluorescent powder with the composition $Sr(Sr_aCa_{1-a})Si_2Al_2N_6$:Eu with a=0.86 and a europium share of 3% (phase purity≥95%) were put into 230 ml of deionized water and stirred constantly. 820 μl of dilute hydrochloric acid (c=5.8 mol/l) was added to the dispersion and the mixture was stirred for 30 min at room temperature. The pH value was determined at the start and end of the process using a pH value measuring probe. After this time the pH value of the mixture was 5.2. The leached-out fluorescent powder was then filtered by suction and washed intensively, first with water and lastly with ethanol. The fluorescent powder was then dried for 2 h at 60° C. and then screened. Finally, the dried fluorescent powder was tempered at 350° C. for 5 h and the resulting stabilized phosphor was designated "SP-7".

Exemplary Embodiment 8

10 g of a fluorescent powder with the composition $Sr(Sr_aCa_{1-a})Si_2Al_2N_6$:Eu with a=0.82 and a europium share of 2% (phase purity≥95%) were put into 500 ml of deionized water and stirred constantly. 7 ml of dilute hydrochloric acid (c=2 mol/l) was added to the dispersion and the mixture was heated to a temperature of 75 to 85° C. The phosphor was leached out at this temperature with constant stirring for 1.5 h. The leached-out phosphor was then filtered by suction and washed intensively, first with water and lastly with ethanol. The fluorescent powder was then dried for 2 h at 60° C. and then screened. Finally, the fluorescent powder was then tempered at 350° C. for 5 h and the resulting stabilized phosphor was designated "SP-8".

Exemplary Embodiment 9

10 g of a fluorescent powder with the composition $Sr(Sr_aCa_{1-a})Si_2Al_2N_6$:Eu with a=0.82 and a europium share of 2% (phase purity≥95%) were put into 500 ml of deionized water and stirred constantly. 7 ml of dilute hydrochloric acid (c=2 mol/l) was added to the dispersion and the mixture was heated to a temperature of 75 to 85° C. The phosphor was leached out at this temperature with constant stirring for 1.5 h. The pH value was determined at the start and end of the process by means of a pH value indicator paper. The leached-out phosphor was then filtered by suction and washed intensively, first with water and then with ethanol. The fluorescent powder was then dried for 2 h at 60° C. and then screened. Finally, the fluorescent powder was tempered at 250° C. for 5 h and the resulting stabilized phosphor was designated "SP-9".

Exemplary Embodiment 10

10 g of a fluorescent powder with the composition $Sr(Sr_aCa_{1-a})Si_2Al_2N_6$:Eu with a=0.82 and a europium share of 2% (phase purity≥95%) were put into 500 ml of deionized water and stirred constantly. 7 ml of dilute hydrochloric acid (c=2 mol/l) was added to the dispersion and the mixture was heated to a temperature of 75 to 85° C. The phosphor was then leached out at this temperature with constant stirring for 1.5 h. The pH value was determined at the start and end of the process by means of a pH value indicator paper. The leached-out phosphor was then filtered by suction and washed intensively, first with water and lastly with ethanol. The fluorescent powder was then dried for 2 h at 60° C. and then screened. Finally, the fluorescent powder was tempered at 350° C. for 5 h and the resulting stabilized phosphor was designated "SP-10".

Exemplary Embodiment 11

10 g of a fluorescent powder with the composition $Sr(Sr_aCa_{1-a})Si_2Al_2N_6$:Eu with a=0.86 and a europium share of 2% (phase purity≥95%) were put into 500 ml of deionized water and stirred constantly. 7 ml of dilute hydrochloric acid (c=2 mol/l) was added to the dispersion and the mixture was heated to a temperature of 75 to 85° C. The phosphor was then leached out at this temperature with constant stirring for 1.5 h. The pH value was determined at the start and end of the process by means of a pH value indicator paper. The leached-out phosphor was then filtered by suction and washed intensively, first with water and then with ethanol. The fluorescent powder was then dried for 2 h at 60° C. and then screened. Finally, the fluorescent powder was tempered at 350° C. for 5 h and the resulting stabilized phosphor was designated "SP-11".

Exemplary Embodiment 12

10 g of a fluorescent powder with the composition $Sr(Sr_aCa_{1-a})Si_2Al_2N_6$:Eu with a=0.86 and a europium share of 2% (phase purity 95%) were put into 500 ml of deionized water and stirred constantly. 7 ml of dilute hydrochloric acid (c=2 mol/l) was added to the dispersion and the mixture was heated to a temperature of 75 to 85° C. The phosphor was leached out at this temperature with constant stirring for 1.5 h. The pH value was determined at the start and end of the process by means of a pH value indicator paper. The leached-out phosphor was then filtered by suction and washed intensively, first with water and lastly with ethanol. The fluorescent powder was then dried for 2 h at 60° C. and then screened. Finally, the dried fluorescent powder was tempered at 450° C. for 5 h and the resulting stabilized phosphor was designated "SP-12".

The relative stability of the leached-out samples "SP-1" to "SP-12" was evaluated by a PCT test over a period of 130 h and the results shown in FIG. 10. The relative stability of a sample not covered with a protective layer of a comparable phosphor, designated "UP-1", is also shown as a reference. It is clearly recognizable that all samples treated with the acid solution have an increased stability compared with the untreated sample.

Figure 11A:
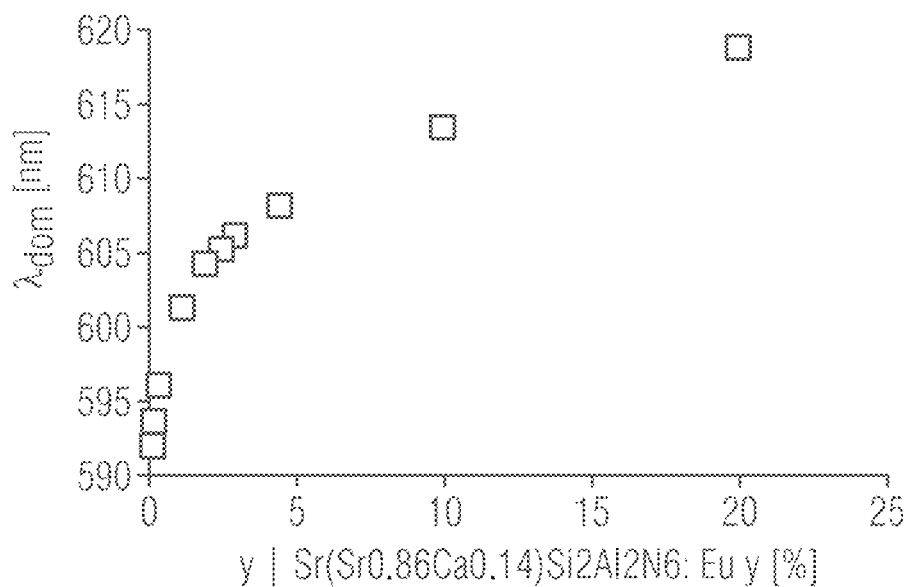
Figure 11B:
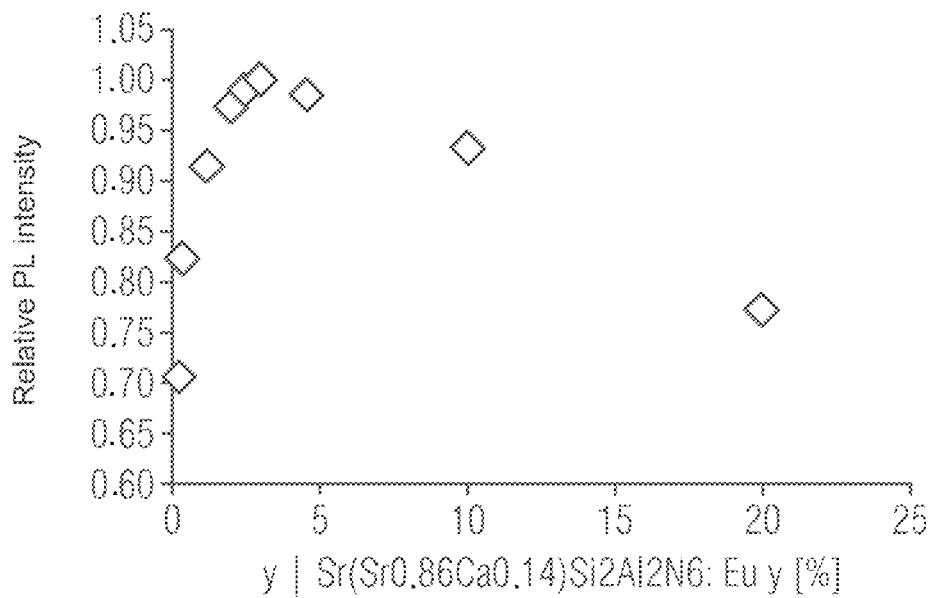

FIGS. 11a to 11c show the dominant wavelengths, the relative intensities of the photoluminescence and the relative photoluminescence intensities assessed visually of different embodiments of a novel phosphor of the formula $Sr(Sr_{0.86}Ca_{0.14})Si_2Al_2N_6$:Eu as a function of rising activator concentrations of europium. As the concentration of europium dopant rises, the dominant wavelength of the emission of the novel phosphors shifts to higher wavelengths from the orange to the red colour range (see FIG. 11a), wherein the relative intensity of the photoluminescence rises from 0.1- roughly 4 mol % and then declines again as the activator concentrations of europium rise further (see FIG. 11b). With regard to the relative intensity of the photoluminescence, a concentration range of 1-10 mol % Eu, or 2-5 mol % is preferable. The relative luminescent photoluminescence intensity assessed by eye sensitivity also behaves in a largely analogous manner to the relative intensity of the photoluminescence, increasing likewise as activator concentrations of europium rise and declining again from roughly 4 mol % to roughly 20 mol % (see FIG. 11c). The sensitivity of the human eye for seeing in daylight is taken into account here. With regard to the luminescent photoluminescence intensity, activator concentrations of 0.4-10 mol % Eu, or 1-5 mol % europium are preferable.

Figure 12B:
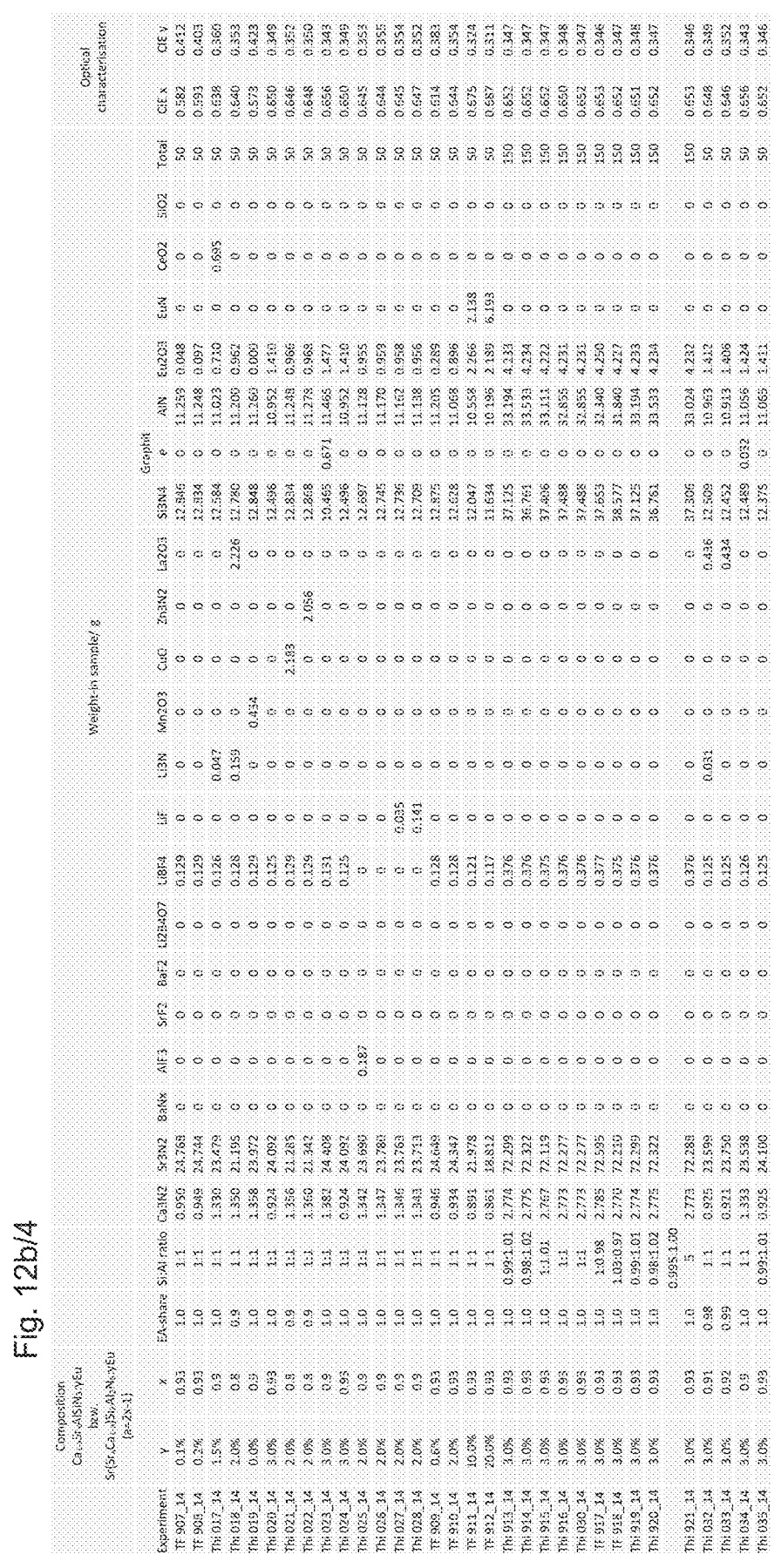

FIGS. 12a/1 to 12a/3 and FIGS. 12b/1 to 12b/4 show the weigh-in samples m in grams for various educts for the production of conventional $CaAlSiN_3$ phosphors and novel phosphors of the general formula $Sr(Sr_aM_{1-a})Si_2Al_2N_6$:D. Weigh-in samples with x smaller than or equal to 0.8 here designate conventional $CaAlSiN_3$ phosphors, while weigh-in samples with x greater than 0.8 (corresponds to a >0.6) characterize novel red or orange emitting phosphors.

Compared with conventional coating processes, which produce a protective layer by chemical vapor deposition (CVD), for example, or a silicon dioxide layer by hydrolysis of tetraethyl orthosilicate, also called tetraethoxysilane (TEOS), the method according to the invention is constructed substantially more simply and economically. In particular, no complex apparatus and expensive chemicals are necessary. Furthermore, the processes according to the invention can be executed without easily inflammable starting materials and only require small quantities of ethanol. The adhesion of the protective layer produced to the phosphor particles is also greater than for a protective layer applied via external chemicals, as the protective layer is formed "intrinsically" directly from the phosphor material located on the surface regions of the phosphor particles. Phosphors coated by the method according to the invention are therefore also less susceptible to hydrolysis.

The invention is not limited by the description with reference to the exemplary embodiments. On the contrary, the invention comprises every new feature and every combination of features, which includes in particular every combination of features in the claims, even if this feature or this combination is not itself explicitly indicated in the claims or exemplary embodiments.

What is claimed is:

1. A method for producing phosphor particles of a Si-containing and/or Al-containing phosphor with a protective layer, the method comprising:
    treating the Si-containing and/or Al-containing phosphor with an acid solution;
    applying at least one of the following pH control methods:
        adding an acid as a function of a pH value of the acid solution;
        adding a buffer solution; and
        adding a defined quantity of acid solution as a function of a quantity of phosphor, wherein a pH value of the acid solution is maintained within a range of pH 3.5 to pH 7 for a period of at least 1 h, wherein a Si-containing layer is formed on the phosphor particles, wherein the Si-containing layer has a higher content of Si on a surface than the phosphor particles, and/or wherein an Al-containing layer is formed on the phosphor particles, and wherein the Al-containing layer has a modified content of aluminum on the surface than the phosphor particles; and
    tempering the treated phosphor particles at a temperature of at least 100° C. thereby producing the protective layer.

2. The method according to claim 1, wherein treating the Si-containing and/or Al-containing phosphor with the acid solution comprises maintaining a pH value in a range of pH 4 to pH 6.5.

3. The method according to claim 1, wherein treating the Si-containing and/or Al-containing phosphor with the acid solution comprises applying the acid solution for a period of 4 h to 5 h.

4. The method according to claim 1, wherein tempering the treated phosphor particles comprises performing tempering in an atmosphere containing oxygen.

5. The method according to claim 1, wherein the Si-containing and/or Al-containing phosphor further comprises alkaline earth ions, and wherein the protective layer has a lower content of alkaline earth ions than the phosphor particles.

6. The method according to claim 1, wherein the Si-containing and/or Al-containing phosphor contains an inorganic substance, wherein the substance includes in its composition at least element D, element A1, element AX, element SX and element NX, wherein the element D represents one or more elements from the group consisting of Mn, Ce, Pr, Nd, Sm, Eu, Tb, Dy, Ho, Er, Tm, Li, Na, K, Rb, Cs and Yb, wherein the element A1 represents one or more elements from divalent metals that are not included in the element D, wherein the element SX represents one or more elements from tetravalent metals containing Si, wherein the element AX represents one or more elements from trivalent metals containing Al, wherein the element NX represents one or more elements selected from the group consisting of O, N, S, C, Cl, and F, wherein the substance has the same crystal structure as $Sr(Sr_aCa_{1-a})Si_2Al_2N_6$, and wherein a value of a is between 0.6 and 1.

7. The method according to claim 1, wherein the Si-containing and/or Al-containing phosphor is a phosphor with the general formula $Sr(Sr_aM_{1-a})Si_2Al_2N_6{:}D$, wherein element M is selected from the group consisting of Ca, Ba, Zn and Mg, wherein element D is selected from the group consisting of Eu and Ce, and wherein a value of a is between 0.6 and 1.0.

8. A method for producing phosphor particles of a Si-containing and/or Al-containing phosphor with a protective layer, the method comprising:
    treating the Si-containing and/or Al-containing phosphor with an acid solution, wherein a pH value of the acid solution is maintained within a range of pH 3.5 to pH 7 for a period of at least 1 h, wherein a Si-containing layer is formed on the phosphor particles, wherein the Si-containing layer has a higher content of Si on a surface than the phosphor particles, and/or wherein an Al-containing layer is formed on the phosphor particles, and wherein the Al-containing layer has a modified content of aluminum on the surface than the phosphor particles; and
    tempering the treated phosphor particles at a temperature of at least 100° C. thereby producing the protective layer,
    wherein tempering the treated phosphor particles comprises performing tempering in an atmosphere containing oxygen.

9. The method according to claim 8, wherein tempering the treated phosphor particles comprises performing tempering at a heating rate between 1° C./h and 100° C./h.

10. A method for producing phosphor particles of a Si-containing and/or Al-containing phosphor with a protective layer, the method comprising:
    treating the Si-containing and/or Al-containing phosphor with an acid solution, wherein a pH value of the acid solution is maintained within a range of pH 3.5 to pH 7 for a period of at least 1 h, wherein a Si-containing layer is formed on the phosphor particles, wherein the Si-containing layer has a higher content of Si on a surface than the phosphor particles, and/or wherein an Al-containing layer is formed on the phosphor particles, and wherein the Al-containing layer has a modified content of aluminum on the surface than the phosphor particles; and
    tempering the treated phosphor particles at a temperature of at least 300° C. and at most 450° C. thereby producing the protective layer.

11. The method according to claim 10, wherein tempering the treated phosphor particles comprises tempering the treated phosphor particles at temperatures between 300° C. to 350° C.

12. The method according to claim 10, wherein treating the Si-containing and/or Al-containing phosphor with an acid solution comprises applying at least one of the following pH control methods:
   adding an acid as a function of the pH value of the acid solution;
   adding a buffer solution; and
   adding a defined quantity of acid solution as a function of a quantity of phosphor.

13. A plurality of phosphor particles with a protective layer located on at least parts of a surface of the phosphor particles,
   wherein the phosphor particles comprise a Si-containing and/or Al-containing phosphor,
   wherein the protective layer has a content of Si that is increased by at least 40 at. % compared with a phosphor and/or a content of Al that is reduced by at least 10% compared with the phosphor,
   wherein the phosphor particles comprise a phosphor containing an inorganic substance, which includes in its composition at least element D, element A1, element AX, element SX and element NX,
   wherein the element D represents one or more elements from the group consisting of Mn, Ce, Pr, Nd, Sm, Eu, Tb, Dy, Ho, Er, Tm, Li, Na, K, Rb, Cs and Yb,
   wherein the element A1 represents one or more elements from divalent metals that are not included in the element D,
   wherein the element SX represents one or more elements from tetravalent metals containing Si,
   wherein the element AX represents one or more elements from trivalent metals containing Al,
   wherein the element NX represents one or more elements from the group consisting of O, N, S, C, Cl, and F,
   wherein the substance has the same crystal structure as $Sr(Sr_aCa_{1-a})Si_2Al_2N_6$, and
   wherein a value of a is between 0.6 and 1.0.

14. The plurality of phosphor particles according to claim 13, wherein the phosphor particles additionally comprise alkaline earth ions, and wherein the protective layer has a content of alkaline earth ions that is reduced by at least 40 at. % compared with the phosphor.

15. The plurality of phosphor particles according to claim 13, wherein a Si-content of the protective layer is increased by at least 40 at. % compared with the phosphor.

16. The plurality of phosphor particles according to claim 13, wherein an Al-content of the protective layer is reduced by at least 10 at. % to a maximum of 50 at. % compared with the phosphor.

17. A plurality of phosphor particles with a protective layer located on at least parts of a surface of the phosphor particles,
   wherein the phosphor particles comprise a Si-containing and/or Al-containing phosphor,
   wherein the protective layer has a content of Si that is increased by at least 40 at. % compared with a phosphor and/or a content of Al that is reduced by at least 10% compared with the phosphor,
   wherein the Si-containing phosphor is a phosphor with the general formula:

$Sr(Sr_aM_{1-a})Si_2Al_2(N,X)_6{:}D,A,E,G,L$ wherein element M is selected from Ca, Ba, Mg alone or in combination,
   wherein element A is selected from divalent metals different from the element M and element D,
   wherein the element D is selected from one or more elements from the group consisting of Mn, Ce, Pr, Nd, Sm, Eu, Tb, Dy, Ho, Er, Tm, Li, Na, K, Rb, Cs and Yb,
   wherein element E is selected from monovalent metals,
   wherein element G is selected from tetravalent elements,
   wherein element X is selected from O or halogen,
   wherein element L is selected from trivalent elements, and
   wherein a value of a is between 0.6 and 1.0.

* * * * *